US011024074B2

(12) United States Patent
Noris et al.

(10) Patent No.: US 11,024,074 B2
(45) Date of Patent: Jun. 1, 2021

(54) VIRTUAL SPACES, MIXED REALITY SPACES, AND COMBINED MIXED REALITY SPACES FOR IMPROVED INTERACTION AND COLLABORATION

(71) Applicant: Facebook Technologies, LLC, Menlo Park, CA (US)

(72) Inventors: Gioacchino Noris, Zurich (CH); Panya Inversin, Zurich (CH); James Allan Booth, Zurich (CH); Sarthak Ray, Santa Clara, CA (US); Alessia Marra, Zurich (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/234,128

(22) Filed: Dec. 27, 2018

(65) Prior Publication Data

US 2020/0211251 A1 Jul. 2, 2020

(51) Int. Cl.

*G06T 15/00* (2011.01)
*G06F 3/16* (2006.01)
*G06F 3/01* (2006.01)
*G06T 19/20* (2011.01)

(52) U.S. Cl.

CPC ............ *G06T 15/005* (2013.01); *G06F 3/013* (2013.01); *G06F 3/167* (2013.01); *G06T 2200/04* (2013.01)

(58) Field of Classification Search

CPC ... G06T 15/005; G06T 2200/04; G06F 3/013; G06F 3/167

See application file for complete search history.

(56) References Cited

U.S. PATENT DOCUMENTS 8,812,954 B2 8/2014 Shuster
9,323,325 B2 * 4/2016 Perez ...................... G06F 3/017
2010/0245376 A1 * 9/2010 Bar-Zeev ................ G06T 19/20 345/589
2012/0142415 A1 6/2012 Lindsay
2013/0083062 A1 * 4/2013 Geisner ................ G02B 27/017 345/633
2013/0342564 A1 12/2013 Kinnebrew
2016/0026253 A1 * 1/2016 Bradski .............. G02B 27/0172 345/8
2016/0093108 A1 3/2016 Mao
2016/0300387 A1 10/2016 Ziman
2018/0122043 A1 * 5/2018 Energin ................ A63F 13/428
2018/0307303 A1 * 10/2018 Powderly ................ G06F 3/017

OTHER PUBLICATIONS

Sylvia Irawati, Daniela Calderon and Heedong Ko, "Spatial Ontology for Semantic Integration in 3D Multimodal Interaction Framework," VRCIA 2006, Hong Kong, Jun. 14-16, 2006, ACM 2006, p. 129-135. (Year: 2006).*

International Search Report and Written Opinion for International Application No. PCT/US2019/017947, dated Nov. 28, 2019.

* cited by examiner

*Primary Examiner* — Sing-Wai Wu
(74) *Attorney, Agent, or Firm* — Baker Botts L.L.P.

(57) ABSTRACT

In one embodiment, a method includes displaying a first virtual content to a first user in a virtual area, the virtual area comprising one or more second virtual content, inferring an intent of the first user to interact with the first virtual content based on one or more of first user actions or contextual information, and adjusting one or more configurations associated with one or more of the second virtual content based on the inferring of the intent of the first user to interact with the first virtual content.

20 Claims, 18 Drawing Sheets

600

610 Display a first virtual content to a first user in a virtual area, the virtual area comprising one or more second virtual content 620 Infer an intent of the first user to interact with the first virtual content based on one or more of first user actions or contextual information 630 Adjust one or more configurations associated with one or more of the second virtual content based on the inferring of the intent of the first user to interact with the first virtual content

500

VIRTUAL SPACES, MIXED REALITY SPACES, AND COMBINED MIXED REALITY SPACES FOR IMPROVED INTERACTION AND COLLABORATION

TECHNICAL FIELD

This disclosure generally relates to artificial reality environments, including virtual reality environments and mixed virtual reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers

SUMMARY OF PARTICULAR EMBODIMENTS

Particular embodiments described herein relate to a method of creating a system for using contextual information and a user's intent to modify a VR environment for the purpose of creating an isolated experience for the user. This system may first determine whether the user wants to focus on interacting with a particular object based on the user's movement, interaction with the object, and eye movement. Once the system determines that the user wants to interact with a particular object, the system may then modify the environment to maximize the user's experience with the particular object.

Particular embodiments described herein relate to creating a system for merging realities between various user's locations to create a joint VR space using each user's free space. This system may first determine that a particular user's free space is sufficiently large to accommodate a joint VR space. Then, the system may map out or retrieve a map of the particular user's free space, and coordinate with other users that also want to participate in the joint VR space by determining and creating a framework for the joint VR space that accommodates the free space restrictions of each of the users and maximizes overlap between the users' free spaces.

Particular embodiments described herein relate to synchronizing content and objects from real life with those in the digital/VR environment to enhance user interaction, communication, and cooperation with other users (e.g., for collaborating on projects). This system may first determine what objects within the user's real-life environment the user may want to use to collaborate with other users. Then, the system may copy and present the real-life objects within the UI of the VR shared space in real time so that other users in the VR shared space can view and interact with the objects.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Artificial Reality Overview

Figure 1:
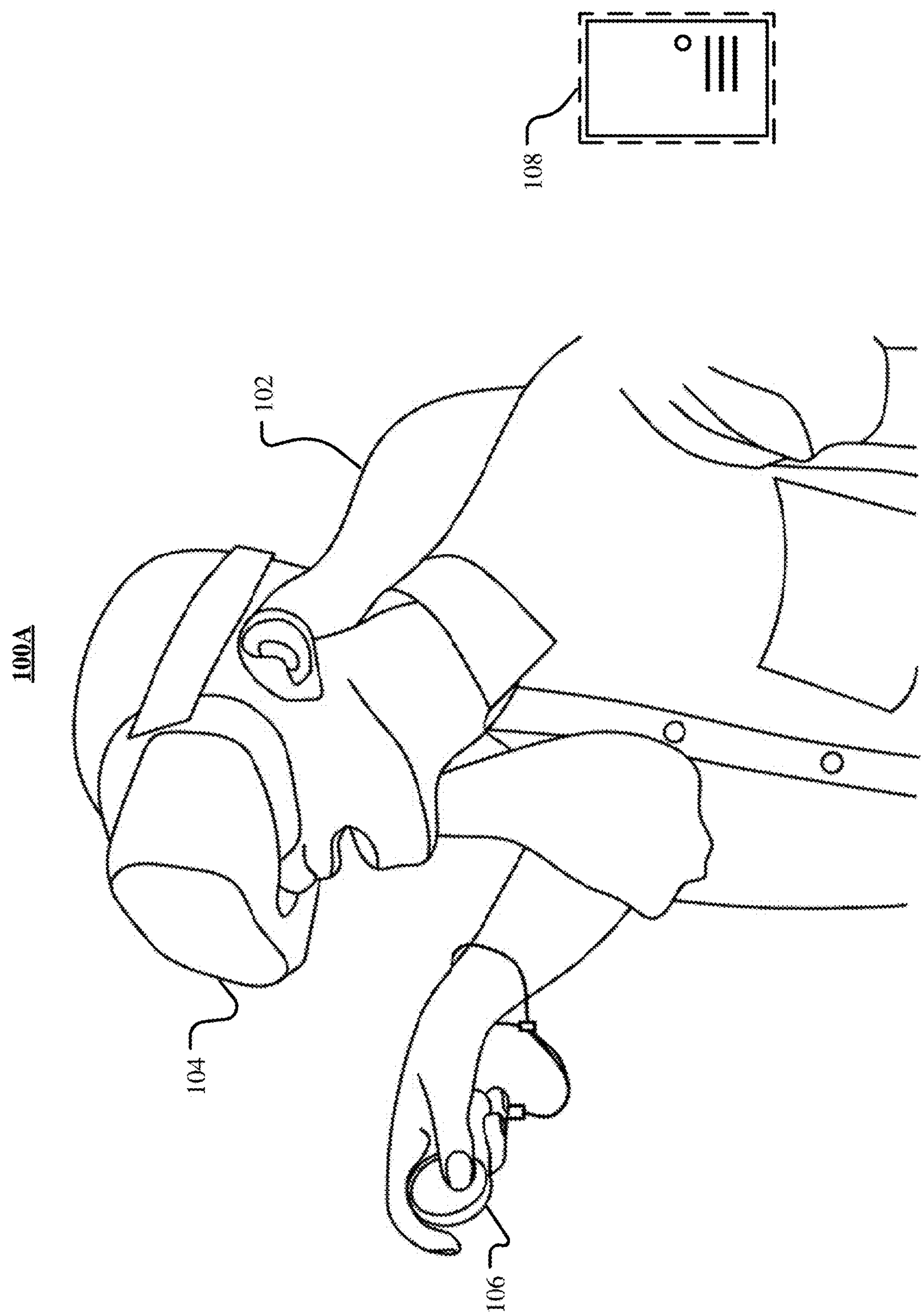
FIG. 1 illustrates an example artificial reality system.

FIG. 1 illustrates an example artificial reality system 100. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 2:
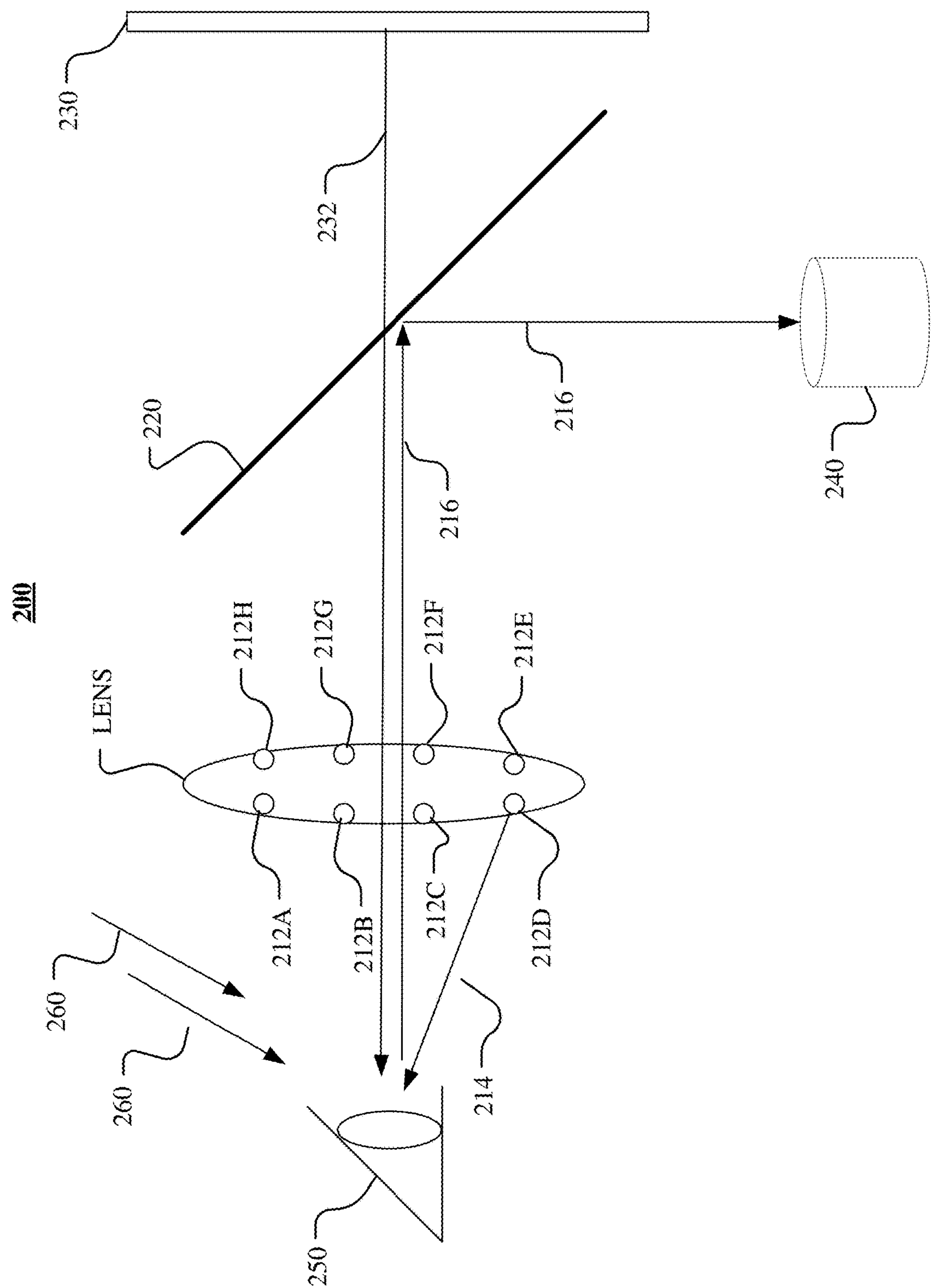
FIG. 2 illustrates an example 3D eye tracking system.

In particular embodiments, the artificial reality system may include an eye tracking system for tracking the user's eyes in real time. The eye tracking system may be a 3D eye tracking system tracking the user's eye movements (e.g., gazing direction, gazing angle, convergence) and determine where the user is looking at (e.g., vergence distance or gazing point). FIG. 2 illustrates an example 3D eye tracking system 200. The 3D eye tracking system 200 may track the three-dimensional eye movement to determine the user's vergence distance or gazing point. The vergence distance of a user may be a distance from the user's eyes to a point which the user's eyes are converged at. A gazing point of a user may be a point that the user is gazing at. The eye tracking system 200 may include a lens 210, a number of infrared light sources (e.g., 212A-H), a hot mirror 220, and an infrared camera 240. The light sources 212A-H may be infrared light emitting diodes (LEDs) mounted on the lens 210. The hot mirror 220 may be a dichroic filter which reflects infrared light while allowing visible light to pass. The emitted infrared light (e.g., 214) by one or more of the light source 212A-H may reach and be reflected off the eye 250. The reflected light 216 may be further reflected by the hot mirror 220 and reach the infrared camera 240. The camera 240 may be an infrared camera capturing images of the eye 250 using the reflected infrared light. The eye tracking system 200 may capture images of both eyes (e.g., pupils) of the user and process the images using computer vision technology. The eye tracking system 200 may measure the angle of the two eyes and use geometric relations to determine the vergence distance and gazing point of the user. The 3D eye tracking system 200 may measure the user's eye angle with an accuracy of 1 degree, for example. The visible light 232 from the display screen 230 may pass the hot mirror 220 and the lens 210 to reach the eye 250 allowing the user to see rendered content by the display screen 230. In particular embodiments, the 3D eye tracking system 200 may use the ambient light 260 from the environment to capture the eye images. The ambient light 240 may reach the eye 250 and may be reflected off the eye 250. The reflected light may pass through the lens 210 and reach the hot mirror 220 and the camera 240. The camera 240 may capture images of the eye 250 based on the ambient light reflected off the eye 250. In particular embodiments, the 3D eye tracking system may use a hybrid method using both light sources (e.g., 212A-212H) and the ambient light 260 to capture eye images and track the eye movements.

In particular embodiments, the 308 may use a machine learning (ML) based approach for eye tracking. The headset system may take a sequence of images of the eyes of the user wearing the headset (e.g., using a camera of a 3D eye tracking system) and use the machine learning (ML) algorithm to process the images and output vergence information. For example, the machine learning (ML) algorithm may include an inference model to determine the vergence distance and gazing point of the user. In particular embodiments, the headset system may include a hybrid approach combining 3D eye tracking and ML-based eye tracking.

In particular embodiments, the artificial reality system may determine vergence distance and gazing point of the user using a combination of approaches. The approaches may include, for example, but are not limited to, eye-tracking based approaches (e.g., 3D eye tracking, ML based eye tracking), body-based approaches (e.g., head position/movement, hand position/movement, body position/movement), and content-based approaches (e.g., Z-buffer, face/object recognition, developer provided information). U.S. patent application Ser. No. 16/132,153, entitled "Vergence Determination," filed on 14 Sep. 2018 (issued as U.S. Pat. No. 10,627,901 on 1 Apr. 2020), which is incorporated by reference as an example only and not by way of limitation, discloses examples of determining vergence distance or gazing point using different combination of approaches.

Figure 3:
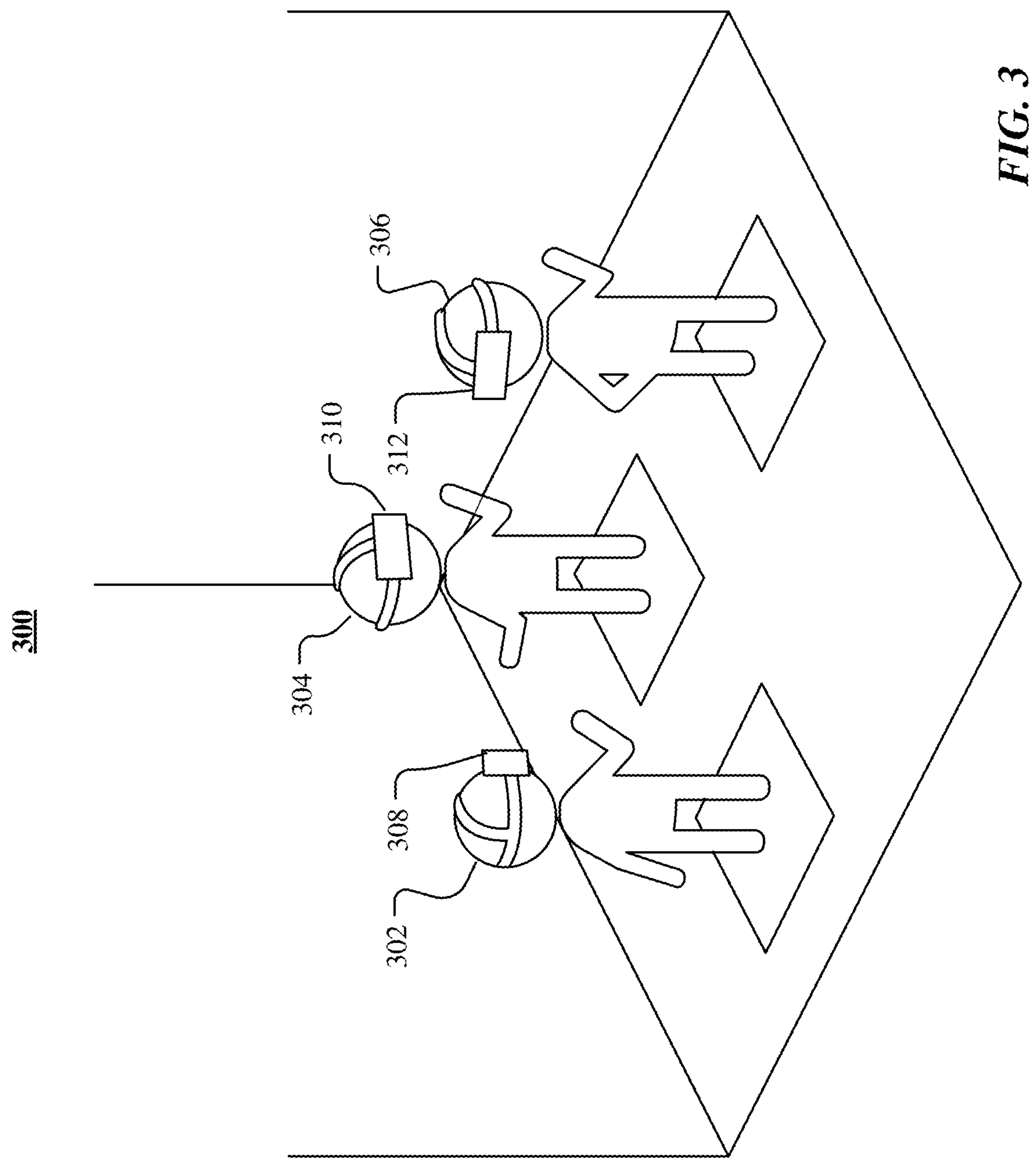
FIG. 3 illustrates an example artificial reality space.

FIG. 3 illustrates an example artificial reality space 300. In particular embodiments, the artificial reality space 300 may include a first user 302, a second user 304, and a third user 306. In particular embodiments, the artificial reality space 300 may include a virtual reality scene rendered in a virtual space by the headset and in the field of view of each of the first user 302, second user 304, and third user 306 wearing headsets 308, 310, and 312, respectively. As discussed in more detail below, the first user 302, second user 304, and third user 306 may access the artificial reality space 300 to meet and collaborate with each other, in addition to interact with one or more objects or items located in the artificial reality space 300.

Triggers

In particular embodiments, a VR environment may be changed or updated based on an analysis of the user's movements in the VR environment and/or interactions with one or more items in the VR environment to better suit the user's needs or provide a better user experience. Particular embodiments described herein are directed to an artificial reality for using contextual information and a user's intent to modify a VR environment for the purpose of creating an isolated experience for the user. As described in more detail below, this system may first determine whether the user wants to focus on interacting with a particular object based on the user's movement, interaction with the object, and eye movement, in addition to various social-networking information (discussed below). Once the system determines that the user wants to interact with a particular object, the system may then modify the environment to maximize the user's experience with the particular object.

Figure 4:
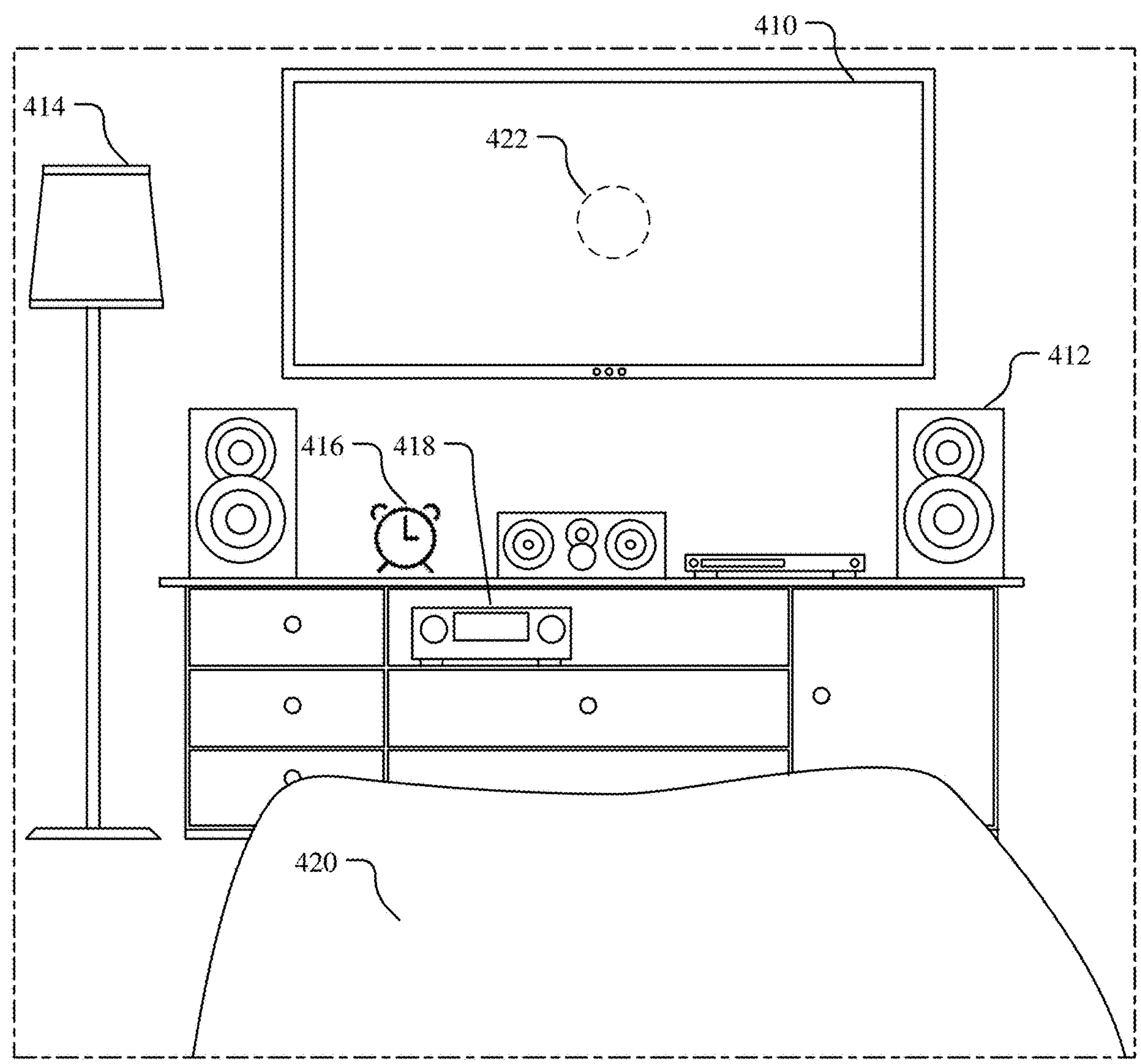
FIG. 4 illustrates an example VR environment.
Figure 5:
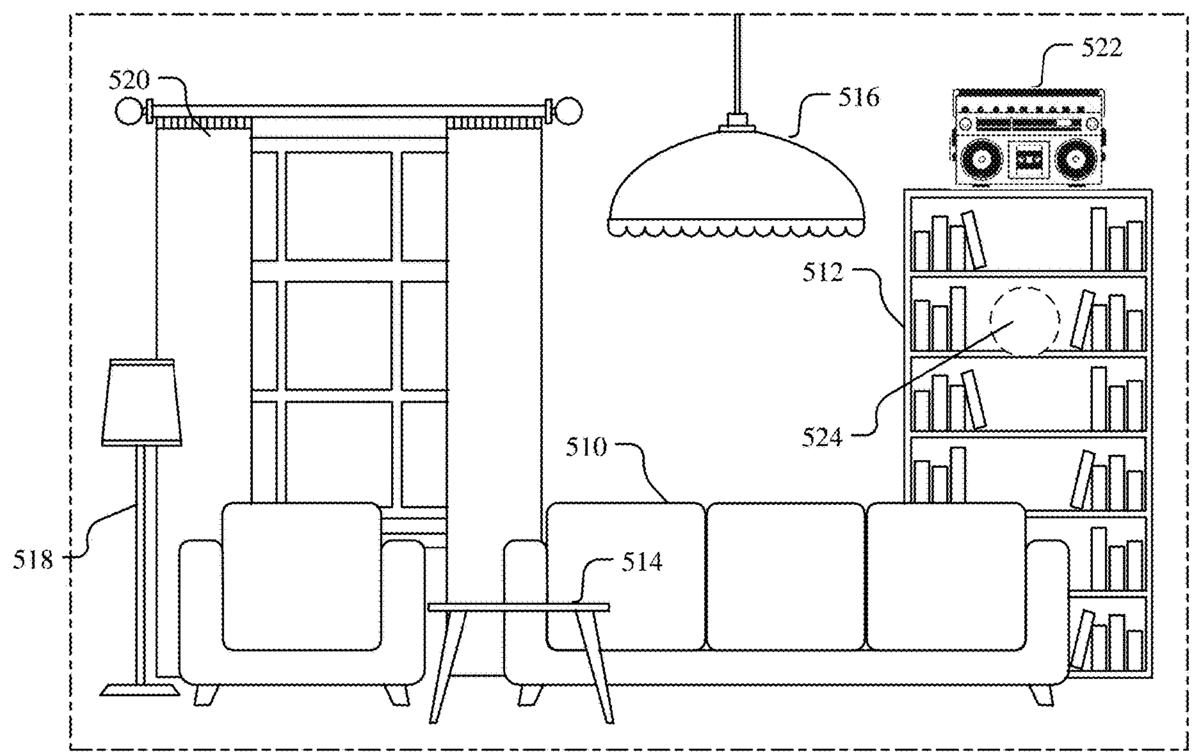
FIG. 5 illustrates another example of a VR environment.

In particular embodiments, the system may infer an intent of the user to focus on interacting with a particular object based on the user's movement or location. FIG. 4 illustrates an example VR environment 400. As shown in FIG. 4, the VR environment 400 includes a screen 410, speakers 412, a lamp 414, an alarm 416, a radio 418, and a sofa 420. In addition, FIG. 5 illustrates another example of a VR environment 500. As shown in FIG. 5, the VR environment 500 includes a sofa 510, a bookshelf 512, a coffee table 514, a ceiling lap 516, a floor lamp 518, a window covered by shades 520, and a radio 522. In particular embodiments, the artificial reality system may make the inference of the intent of the user based on contextual information and one or more "triggers" in the VR environment, which may include determining that the user's movement and/or location is within a predetermined distance or location in relation to one or more objects in the VR environment (e.g., a virtual screen, a bookshelf). These triggers may include instructions associated with the one or more objects in the VR environment that are triggered when particular conditions associated with the user are met (e.g., the user is within a predetermined location or distance to the one or more objects, user movement in relation the one or more objects, etc.)

As an example, as shown in FIG. 4, if the artificial reality system determines that the user wants to watch a show on the screen 410 (e.g., a virtual television screen, a virtual projection screen, etc.) in the VR environment based on the user's movement toward a position proximate to a location of the screen 410 in the VR environment (e.g., by siting in the sofa 420 in front of the screen 410, by standing by the screen 410, etc.), then the system may determine that the user wants to focus their attention on watching the show on the screen 410 and minimize all other distractions. As such, the system may modify the VR environment surrounding the user to create an isolated experience for the user to maximize the user's experience. As an example and not by way of limitation, the system may determine that to isolate the user's experience in watching the show on screen 410, the system may remove any and all distractions by dimming or turning off the lights 414. In addition, the system may remove objects that are distractions, such as turning off the alarm 416, the radio 418, and other relevant objects. Moreover, the system may temporary restricting interactions with other users (e.g., users of a social network, as discussed in more detail below).

As another example, as shown in FIG. 5, if the artificial reality system determines that the user wants to read a book from a bookshelf 512 in the VR environment based on the user's movement toward a position proximate to a location of the bookshelf 512 in the VR environment (e.g., by standing in front of the bookshelf 512, by sitting down on sofa 510, etc.), then the system may determine that the user wants focus their attention on reading the book from the bookshelf 512 and minimize all other distractions. As such, the system may modify the VR environment surrounding the user to create an isolated experience for the user to maximize the experience. As an example and not by way of limitation, the system may remove any and all distractions by brightening and overhead light 516, and also dimming the floor lamp 518 to reduce unnecessary light in the room. In addition, the system may turn on the radio 522 to provide tranquil music. Moreover, the system may remove objects that are distractions and temporary restricting interactions with other users.

In particular embodiments, the artificial reality system may infer an intent of the user to focus on interacting with a particular object based on the user's interaction with the object. In particular embodiments, the system may make the inference of the intent of the user based on contextual information and one or more triggers in the VR environment, including determining the user's level of interaction with one or more objects in the VR environment (e.g., the virtual screen, the bookshelf). These triggers may include instructions associated with the one or more objects in the VR environment that are triggered when particular conditions associated with the user's interaction with the one or more objects are met. As an example, as shown in FIG. 4, if the artificial reality system determines that the user wants to watch a show on the screen 410 in the VR environment based on the user's interaction with the screen 410 (e.g., by using a controller to control the show on the screen 410, by verbally requesting the screen 410 to turn on or to play a show, etc.) or with the sofa 420 in the VR environment (e.g., by siting in the sofa 420 in front of the screen 410), then the system may determine that the user wants to focus their attention on watching the show on the screen 410 and minimize all other distractions (e.g., using the methods of adjusting the visual properties, audio properties, and/or social-networking properties as discussed above). As another example, as shown in FIG. 5, if the artificial reality system determines that the user wants to read a book from a bookshelf 512 in the VR environment based on the user's interaction with a book on the bookshelf 512 (e.g., by removing a book from the bookshelf 512), or with the sofa 510 in the VR environment (e.g., by sitting down on sofa 510), then the system may determine that the user wants focus their attention on reading the book from the bookshelf 512 and minimize all other distractions (e.g., using the methods as discussed above).

In particular embodiments, the artificial reality system may infer an intent of the user to focus on interacting with a particular object based on tracking of the user's eye movement (e.g., using the methods described above in relation to FIG. 2). In particular embodiments, the system may make the inference of the intent of the user based on contextual information and one or more triggers in the VR environment, including determining the user's eye movement in relation to one or more objects in the VR environment (e.g., the virtual screen, the bookshelf). These triggers may include instructions associated with the one or more objects in the VR environment that are triggered when particular conditions associated with tracking the user's eye movement are met. Moreover, the inference of the intent of the user may be determined based on the tracking of the user's eye movement in combination with a temporal component (e.g., a predetermined period of time of user inaction). As an example, as shown in FIG. 4, if the artificial reality system tracks the user's eye movement and determines that the user is looking at the screen 410 in the VR environment for a predetermined amount of time (e.g., by determining that the user's eyes are focused on a point 422 on the screen 410), then the system may determine that the user wants to focus their attention on watching the show on the screen 410 and minimize all other distractions (e.g., using the methods of adjusting the visual properties, audio properties, and/or social-networking properties as discussed above). The determination may be made by further determining that a predetermined period of time of user inaction has passed. As another example, as shown in FIG. 5, if the artificial reality system tracks the user's eye movement and determines that the user wants to read a book from a bookshelf 512 in the VR environment (e.g., by determining that the user's eyes are focused on a point 524 on the bookshelf 512), then the system may determine that the user wants focus their attention on reading the book from the bookshelf 512 and minimize all other distractions (e.g., using the methods as discussed above). For both of these examples, the determination may be made by further accessing the temporal information associated with the user (e.g., determining that a predetermined period of time of user inaction has passed).

In particular embodiments, the modifications to the VR environment may be coded into or associated with the various objects based on a type of object of the particular object that the user wants to interact with (e.g., the screen 410, a book from the bookshelf 512, etc.), based on a type of activity that the user wants to engage in (e.g., watching a show, reading a book, etc.), or a type of service that the particular object is associated with (e.g., the screen 410 is associated with a video application, the book on the bookshelf 512 is associated with a reading application). In addition, the modifications to the VR environment may be user specified or user inputted, or may be based on preset settings (e.g., factory settings) that may be changed or updated by the user.

In particular embodiments, the artificial reality system may infer an intent of the user to focus on interacting with a particular object based on one or more information items stored by or available to the social-networking system (discussed in more detail below). An example of information items stored by the social-networking system may include social-graph information associated with a target user (i.e., the user interacting with the one or more objects). Examples of information items available to the social-networking system may include information items that are accessible by the social-networking system and stored on one or more client systems, one or more third-party systems, one or more networks, or any combination thereof. In particular embodiments, the information items upon which the intent may be inferred may include social-graph information (e.g., nodes and edges, affinities, and degrees of separation), content objects, posts, textual data, location information, media, user profile information, temporal information, and privacy settings. In particular embodiments, one or more of the information items may fall into multiple categories. For example, one or more of the information items may be classified as social-graph information, a post, and media. Alternatively, in particular embodiments, one or more of the information items may fall into only one category.

In particular embodiments, the artificial reality system may infer an intent of the user to focus on interacting with a particular object based on one or more perspectives of one or more users of the social network. For example, the inferred intent may be based on a perspective of a hypothetical user that is based on one or more users of the social network. In particular embodiments, the hypothetical user may be based on every user of the social network. As an example, and not by way of limitation, it may be inferred that a hypothetical user based on every user of the social network would have an intent to watch a show by standing near, interacting with, and/or watching (e.g., as determined based on tracking eye movement) the screen 410 shown in FIG. 4. As another example, it may be inferred that a hypothetical user based on every user of the social network would have an intent to read a book by interacting with or looking at the book on the bookshelf 524 or sitting in the sofa 510 next to the bookshelf 524 as shown in FIG. 5.

As another example, in particular embodiments, the inferred intent may be based on a perspective of a hypothetical user that is based on a subset of users of the social network. In particular embodiments, the subset of users may be determined by any suitable means, including but not limited to one or more numerical limits, one or more temporal limits, one or more location-based limits, one or more degrees of separation, one or more affiliation coefficients between the target user and the users comprising the subset of users, one or more commonalities between the target user and the users comprising the subset of users, or any combination thereof. In particular embodiments, commonalities may include any feature or characteristic shared between the target user and the users comprising the subset of users, including but not limited to location, age, religion or religious beliefs, education, political affiliation or political beliefs, or common interests (e.g., interests in food, books, movies, or music). For example, it may be inferred that a hypothetical user based on a sample set of one hundred users of the social-networking system who share a common interest with the target user, are within two degrees of separation of the target user, and has been standing near, interacting with, and/or watching (e.g., as determined based on tracking eye movement) the screen 410 would have an intent to watch a show on the screen 410. As another example, it may be inferred that a hypothetical user based on a sample set of twenty-five users who are within three years of age of the target user, are within one degree of separation of the target user, are currently reading similar genre books as the target user, and has been interacting with or looking at the book on the bookshelf 524 or sitting in the sofa 510 next to the bookshelf 524 would have an intent to read the book on the bookshelf 524.

Figure 6:
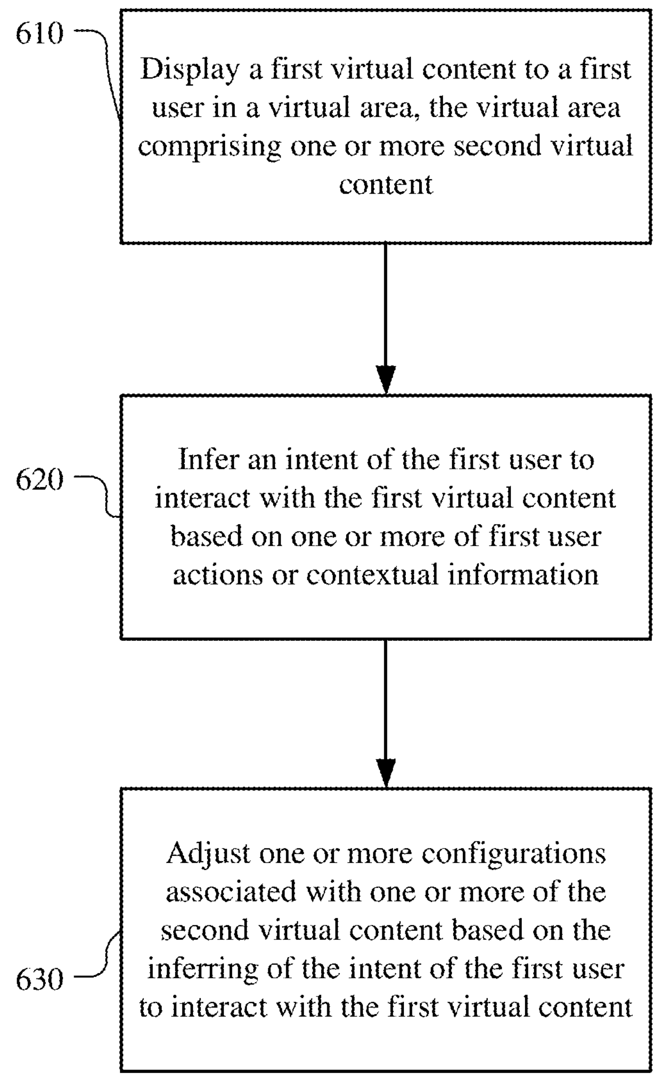
FIG. 6 illustrates an example method for updating a VR environment based on a user's intent and contextual information.

FIG. 6 illustrates an example method 600 for updating a VR environment based on a user's intent and contextual information. The method may begin at step 610, where the artificial reality system may display a first virtual content to a first user in a virtual area, the virtual area comprising one or more second virtual content. At step 620, the artificial reality system may infer an intent of the first user to interact with the first virtual content based on one or more of first user actions or contextual information. At step 630, the artificial reality system may adjust one or more configurations associated with one or more of the second virtual content based on the inferring of the intent of the first user to interact with the first virtual content. In particular embodiments, the first user actions may include one or more of user eye movements focusing on the first virtual content, verbal requests by the first user, user inputs associated with the first virtual content, or user inputs associated with one or more of the second virtual content. In particular embodiments, the contextual information may include one or more of location information associated with the first user, movement information associated with the first user, temporal information associated with the first user, preset actions associated with the first virtual content, a type of content that the first virtual content is associated with, or a type of service that the first virtual content is associated with. As an example, the temporal information associated with the first user may include a predetermined period of time of user inaction.

In particular embodiments, the inferring the intent of the first user may be based at least in part on a perspective of a hypothetical user that is based at least in part on one or more users of a social network associated. As an example, the hypothetical user may be based at least in part on each of the users of the social network, or one or more subsets of the users of the social network. In particular embodiments, adjusting the one or more configurations associated with the second virtual content comprise one or more of adjusting one or more visual properties of one or more of the second virtual content, adjusting one or more audio properties of one or more of the second virtual content, or adjusting one or more social-networking properties of one or more of the second virtual content. As an example, the adjusting of the visual properties or the audio properties of one or more of the second virtual content may be determined based at least in part on a type of content that the second virtual content is associated with or a type of service that the second virtual content is associated with. As another example, the adjusting of the social-networking properties may include temporarily limiting or removing all notifications from the social network associated with the second virtual content. In particular embodiments, the virtual area may reside in a virtual reality environment, and the first user may be a virtual user in the virtual reality environment.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for updating a VR environment based on a user's intent and contextual information including the particular steps of the method of FIG. 6, this disclosure contemplates any suitable method for updating a VR environment based on a user's intent and contextual information including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Portals

In particular embodiments, one or more users may want to create a joint VR space that the users can access and use to interact with each other. Particular embodiments described herein are directed to creating an artificial reality system for merging realities between various user's locations to create a joint VR space using each user's free space. This system may first determine that a particular user's free space is sufficiently large to accommodate a joint VR space. Then, the system may map out or retrieve a map of the particular user's free space, and coordinate with other users that also want to participate in the joint VR space by determining and creating a framework for the joint VR space that accommodates the free space restrictions of each of the users and maximizes overlap between the users' free spaces. In particular embodiments, once the joint VR space is created, the system would allow the user to participate in the joint VR space by, for example, drawing a doorway that can be used to enter the joint VR space (e.g., a "portal"). Once the user enters the joint VR space, they may interact and collaborate with other users in the space. In particular embodiments, guardian boxes may be used to restrict the movement of the users of the joint VR space by cordoning off areas that may be inaccessible to one or more of the users because they are beyond the users' available free space.

Figure 7:
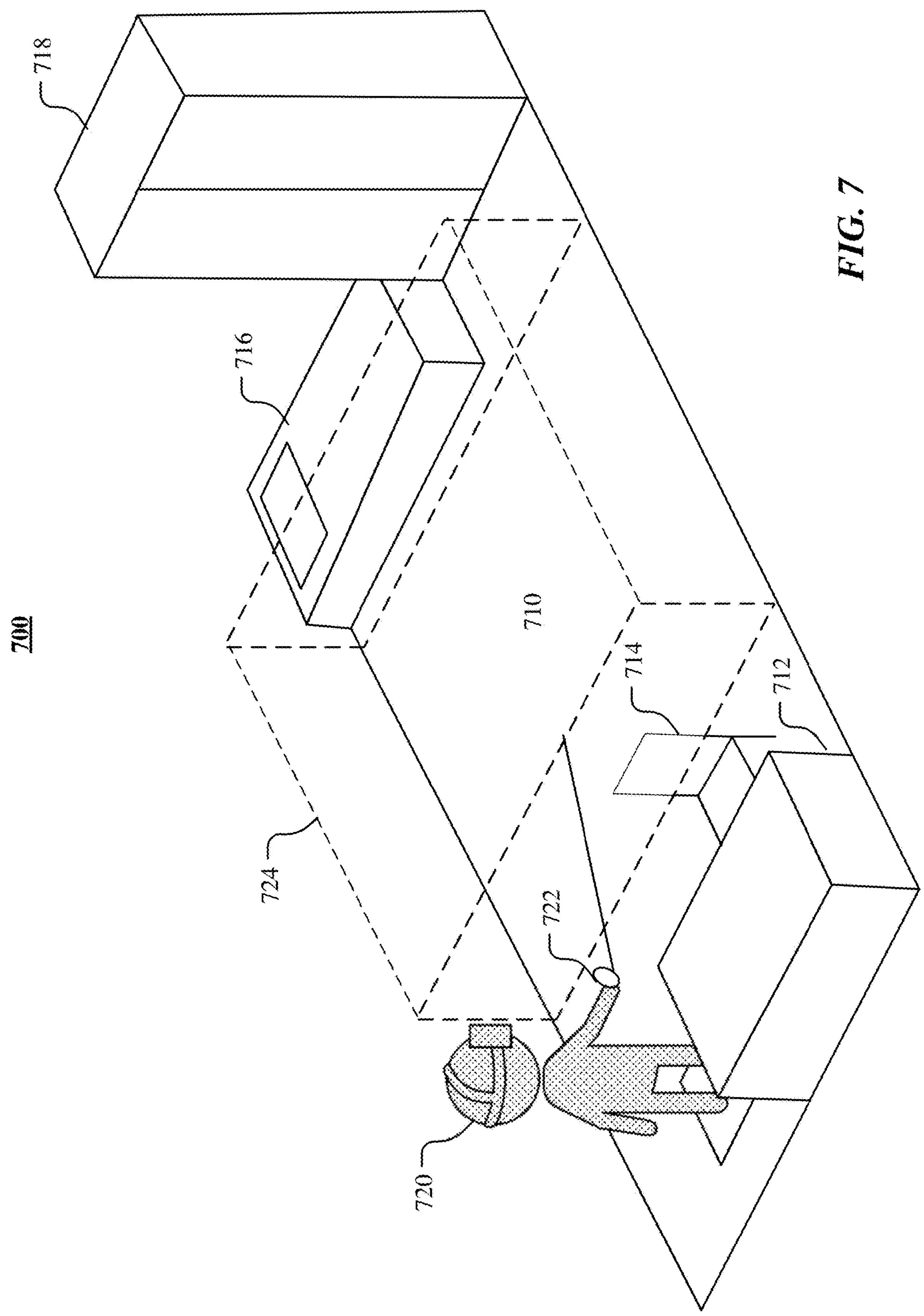
FIG. 7 illustrates an example first user designating a space for merging with a joint VR space with other users.

In particular embodiments, in order to generate a joint VR space the artificial reality system may first determine whether the user has enough free space to accommodate a joint VR space. As an example, the artificial reality system may determine whether the user has a minimum amount of free space by requesting the user to use a system controller (e.g., controller 106) to take a scan of the space for measurement. FIG. 7 illustrates an example first user designating a space 700 for merging with a joint VR space with other users. As shown in FIG. 7, the space 700 includes various items that may block the free space in a room 710 including a desk 712, a chair 714, a bed 716, and a dresser 718. In the middle of the room 710 is an empty area that may be used to create a joint VR space. A user 720 may use a controller 722 (e.g., controller 106) to scan the room 710 to measure the empty area. As an example, the user 720 may use the controller 722 to map out the empty area by outlining the boundaries of the empty area by using straight lines (e.g., as shown in FIG. 7), lines that follow the outline of objects, other suitable methods, or any combination thereof. As another example, the artificial reality system may request measurements from the user that may be manually inputted by the user. By accessing the measurements taken by the controller or inputted by the user, the artificial reality system can calculate the area of the free space in the room 710. If the system determines that this area is greater than a predetermined minimum area, then the system will allow the user to continue with designating the area to be used for the joint VR space. On the other hand, if the system determines that this area is insufficient because it is less than the predetermined minimum area needed to participate in a joint VR space, then the system will output an error message to the user and notify the user that a larger area is necessary.

In particular embodiments, once the system determines that the area is greater than the predetermined minimum area needed to participate in a joint VR space, the system may then ask the user 720 to use the controller 722 to scan the room 710 to map out the empty area in the room. As shown in FIG. 7, the user 720 may use the controller 722 to designate the area 724 (as shown by the dashed lines) as the area to be used for the joint VR space. As an example, the system may ask the user 720 to designate the largest area possible that is available for use in the joint VR space so that the maximum amount of space can used to determine the overlap between various users' spaces. As another example, the system may ask the user 720 to only designate the area that the user wants the joint VR space to cover while leaving other areas out of the assessment (e.g., a hallway area, area for a walkway, etc.). In particular embodiments, this scan of the room 710 may only be needed the first time that the user 720 requests to participate to a joint VR space. Once the system maps out the empty area in the room, the system may store the information for future uses. In particular embodiments, the system may check the stored information first for a previously-stored map of the room before asking the user 720 to map out the empty area in the room. If the system finds a previously-stored map of the room, the system may first ask the user 720 whether he/she wants to use the previously-store map of the room and/or may ask the user 720 whether the room configuration has changes since the time the previously-store map of the room was stored before taking further measurements.

In particular embodiments, after the artificial reality system determines that the user 720 wants to create a joint VR space with one or more other users and determines that the user 720 has enough free space in the room 710, the artificial reality system may then determine one or more other users to participate in the joint VR space. As an example, the artificial reality system may ask the user 720 which other users the user 720 wants to invite to participate in the joint VR space. As another example, the artificial reality system may send a list of other users to the user 720 to select from. As yet another example, the artificial reality system may maintain a list of other users that have expressed interest in joining a joint VR space to interact with other users. The other users may be users from the user's social network as determined through social-graph information (e.g., nodes and edges, affinities, and degrees of separation), as discussed in more detail below. In particular embodiments, the other users may be determined by any suitable means, including but not limited to one or more temporal limits (e.g., other users using the artificial reality system during the same time period as user 720), one or more location-based limits (e.g., other users within a geographic distance or within a particular geographic area), one or more degrees of separation, one or more affiliation coefficients between the user 720 and the others users, one or more commonalities between the user 720 and the others users, or any combination thereof.

Figure 8:
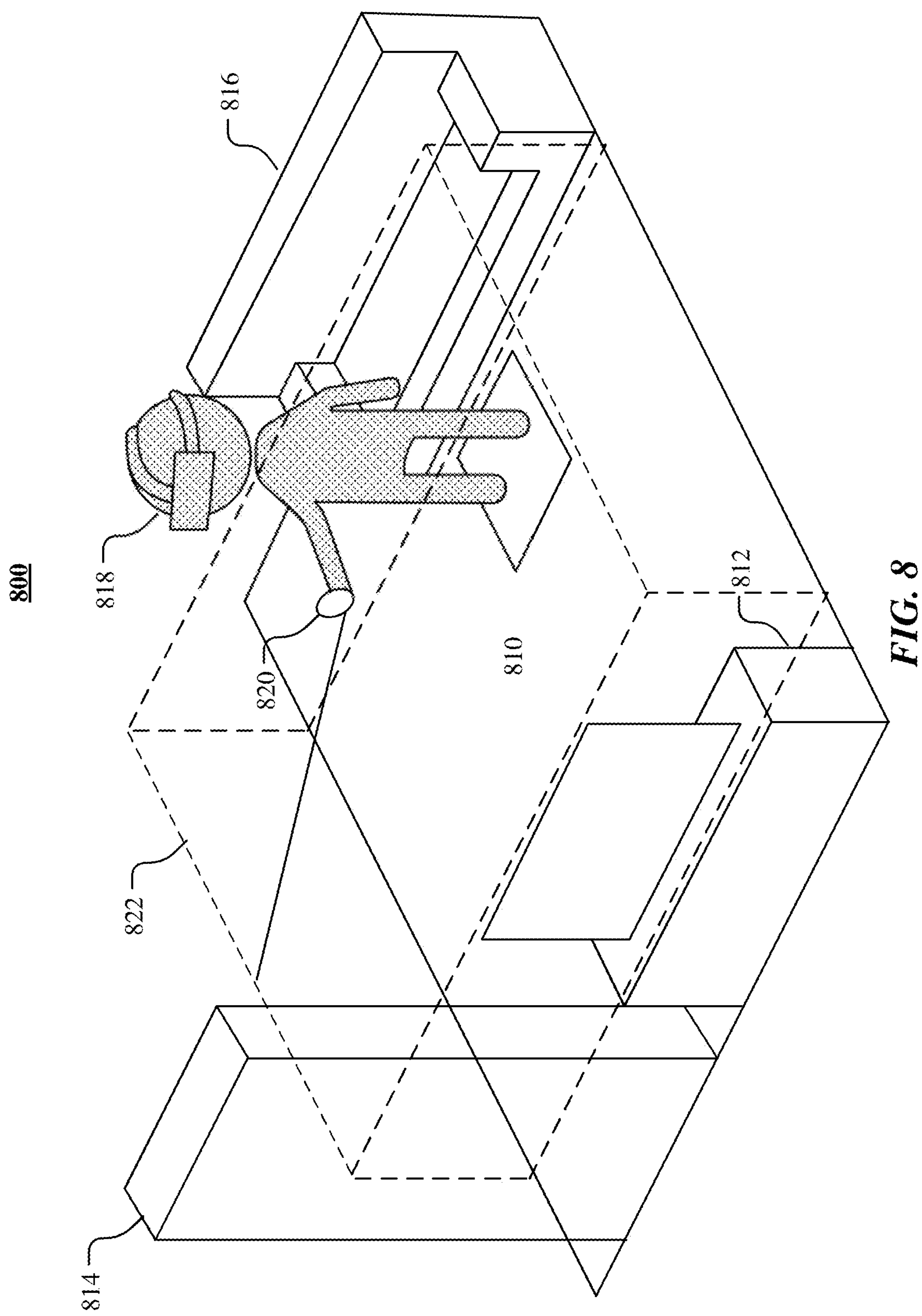
FIG. 8 illustrates an example second user designating a space for merging with a joint VR space with other users.

In particular embodiments, after the artificial reality system determines one or more other users to participate in the joint VR space, the system may retrieve information regarding the space limitations of each of the other user's free space. As an example, the system may request and receive the space-limitation information from each of the other users. If the space-limitation information is unavailable, the system may request the systems of the other users to determine the space-limitation information (similar to the methods described above). FIG. 8 illustrates an example second user designating a space 800 for merging with a joint VR space with other users. As shown in FIG. 8, a space 800 includes various items that may block the free space in a room 810, including a television stand 812, a bookshelf 814, and a sofa 816. In the middle of the room 810 is an empty area that may be used to create a joint VR space. A user 818 may use a controller 820 (e.g., controller 106) to scan the room 810 to measure the empty area. As an example, the user 818 may use the controller 820 to map out the empty area by outlining the boundaries of the empty area by using straight lines (e.g., as shown in FIG. 8), lines that follow the outline of objects, other suitable methods, or any combination thereof. Once the system determines that the area is greater than the predetermined minimum area needed to participate in a joint VR space, the system may then ask the user 818 to use the controller 820 to scan the room 810 to map out the empty area in the room. As shown in FIG. 8, the user 818 may use the controller 820 to designate the area 822 (as shown by the dashed lines) as the area to be used for the joint VR space.

Figure 9:
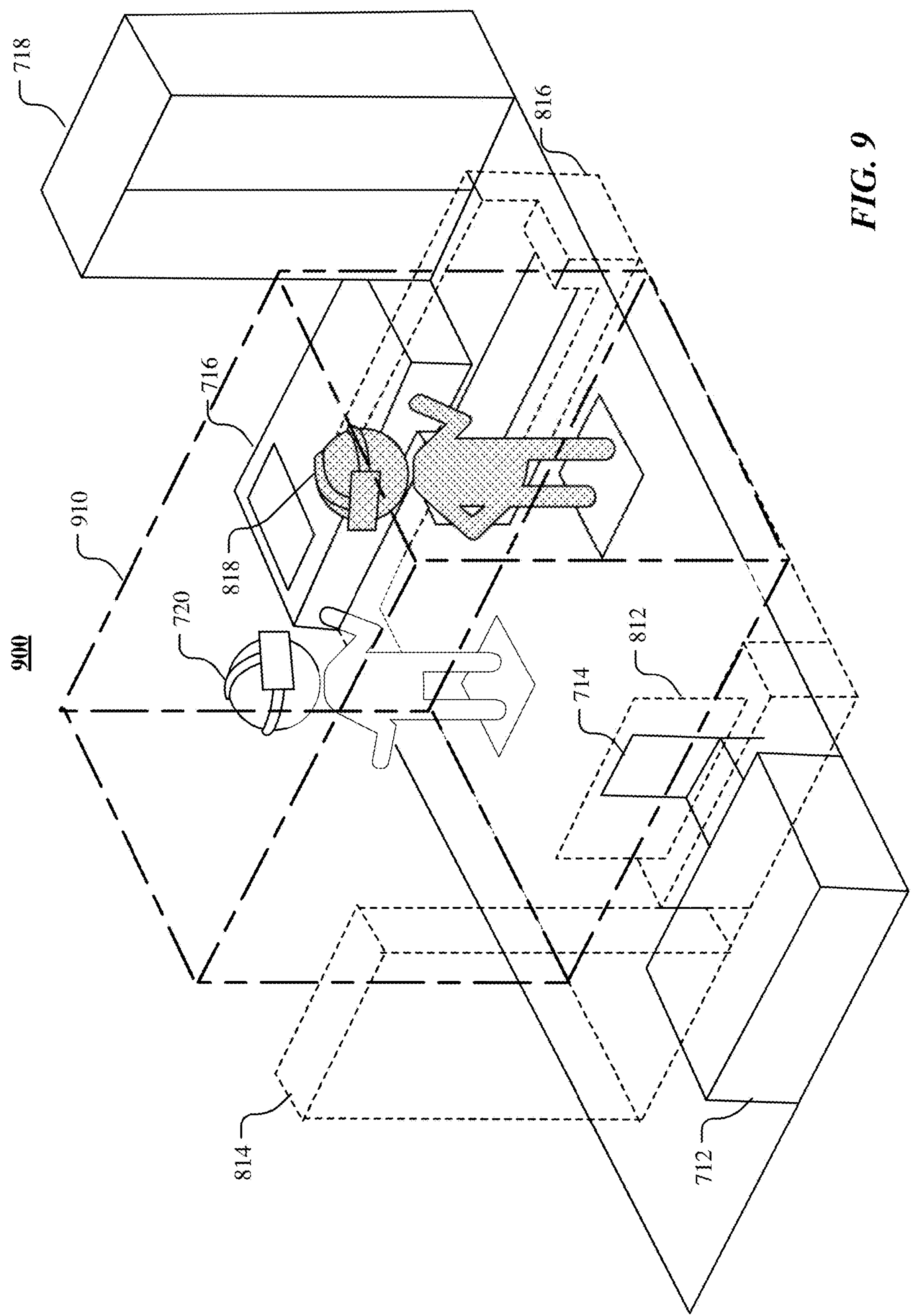
FIG. 9 illustrates an example merged VR environment.

Once the space-limitation information for all the other users that want to participate in the joint VR space is received, the artificial reality system may determine and create a framework for the joint VR space that accommodates the free space restrictions of each of the users and maximizes overlap between the users' free spaces. FIG. 9 illustrates an example merged VR environment 900. As shown in FIG. 9, the merged VR environment 900 is created by maximizing the overlap between the free spaces of user 720 and user 818. The free space of the room 710 of user 720, as shown in FIG. 9 using solid lines, is blocked by the various items in the room 710 including the desk 712, the chair 714, the bed 716, and the dresser 718. In addition, the free space of the room 810 of user 818, as shown in FIG. 9 using light dashed lines, is blocked by the various items in the room 810 including the television stand 812, the bookshelf 814, and the sofa 816. As shown in FIG. 9, room 710 has a larger area and also a larger free space area than room 810, and thus the merged VR environment 900 is limited by the free space area of room 810. In determining a maximum overlap area 910 between rooms 710 and 810, the artificial reality system may determine a maximum overlap between the maximum free space associated with the room 710 and the maximum free space associated with the room 810. This maximum overlap area 910 is then used as the joint VR space in which users 720 and 818 can use together to interact with each other and other users. In particular embodiments, the maximum overlap area used as the joint VR space may be a square, rectangular, circular, polygonal, or other suitable area that maximizes the free space available.

In particular embodiments, the maximum overlap area used as the joint VR space may include certain areas that are cordoned off so that the users do not bump into or move to close to certain areas in the user's room (e.g., cordoning off an area around a stove even it is located in the free space area). As an example, these areas may be cordoned off using guardian boxes displayed in the merged VR environment. The guardian boxes may be visual cues that tell the users in the merged VR environment that the area is restricted from access.

Figure 10A:
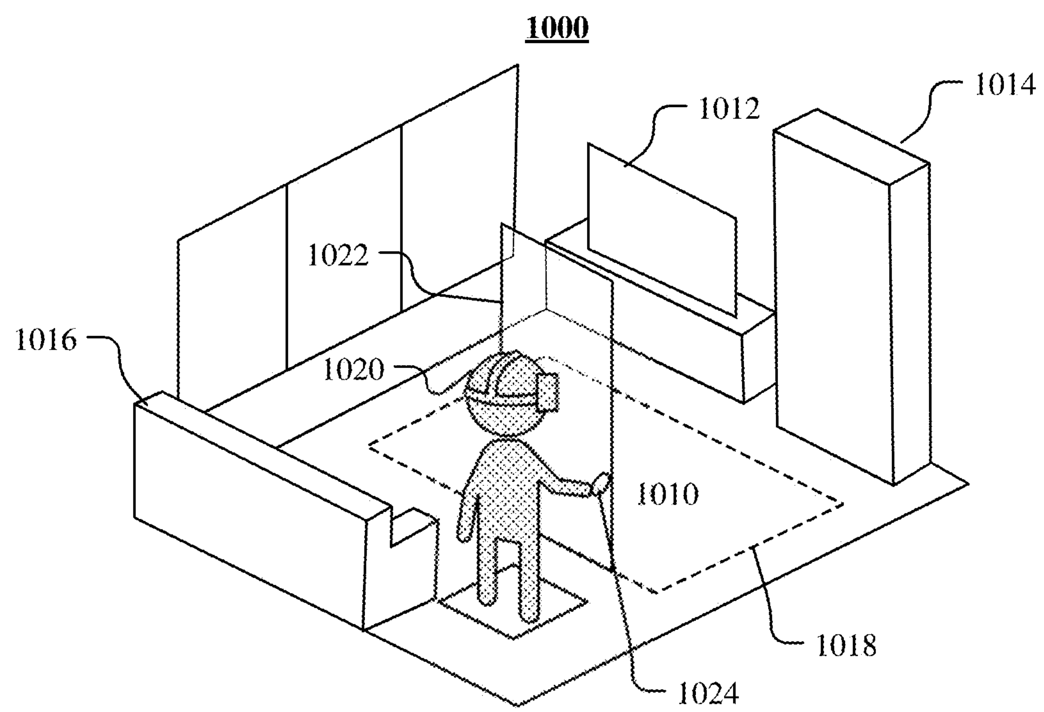
FIGS. 10A and 10B illustrate an example of creating a portal object for accessing the merged VR environment.
Figure 10B:
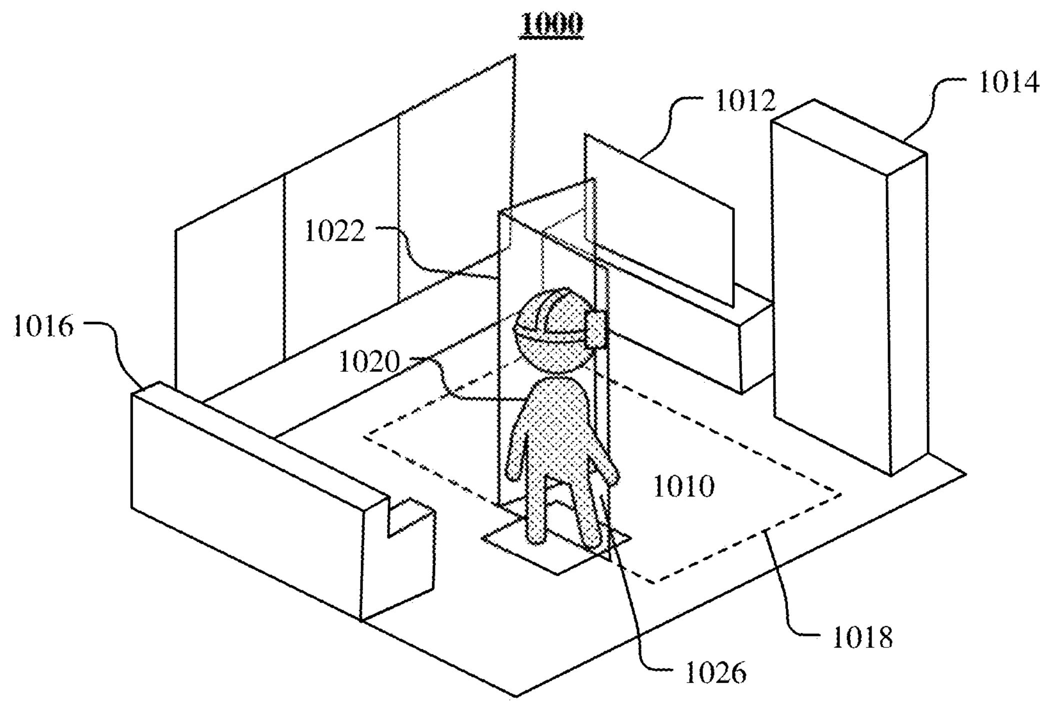

In particular embodiments, once the joint VR space is created, the artificial reality system may notify users 720 and 818 that the joint VR space is available and accessible for use to interact with each other. As an example, the notifying of users 720 and 818 may include sending instructions to users 720 and 818 to generate a portal object that allows users 720 and 818 to virtually access the joint virtual space. FIGS. 10A and 10B illustrate an example of creating a portal object in space 1000 for accessing the merged VR environment. In particular embodiments, generating a portal object may comprise the artificial reality system sending instructions to both users 720 and 818 to draw a virtual doorway within an area in their respective rooms 710*m* 810 that allows that each of users 720 and 818 to virtually access the joint virtual space. As shown in FIG. 10A, space 1000 includes various items that may block the free space in room 1010, including a television stand 1012, a bookshelf 1014, and a sofa 1016. In the middle of the room 1010 is an empty area 1018 has been used to create a joint VR space. Once the artificial reality system notifies user 1020 that the joint VR space is available, the artificial reality system may send instructions to the user 1020 to generate a portal object in order to access the joint VR space. As an example, as shown in FIG. 10A, the artificial reality system may send instructions to the user 1020 to generate a portal object 1022 (e.g., a door) to access the joint VR space. The portal object 1022 may be generated by the user 1020 using a controller 1024 (e.g., controller 106) by tracing an outline of the portal object 1022, selecting the portal object 1022 from a list of selections, or any other suitable means. Once the portal object 1022 is generated, as shown in FIG. 10B, the user 1020 may interact with the portal object 1022 (e.g., open the door and step through the doorway 1026) in order to access the joint VR space.

Figure 11:
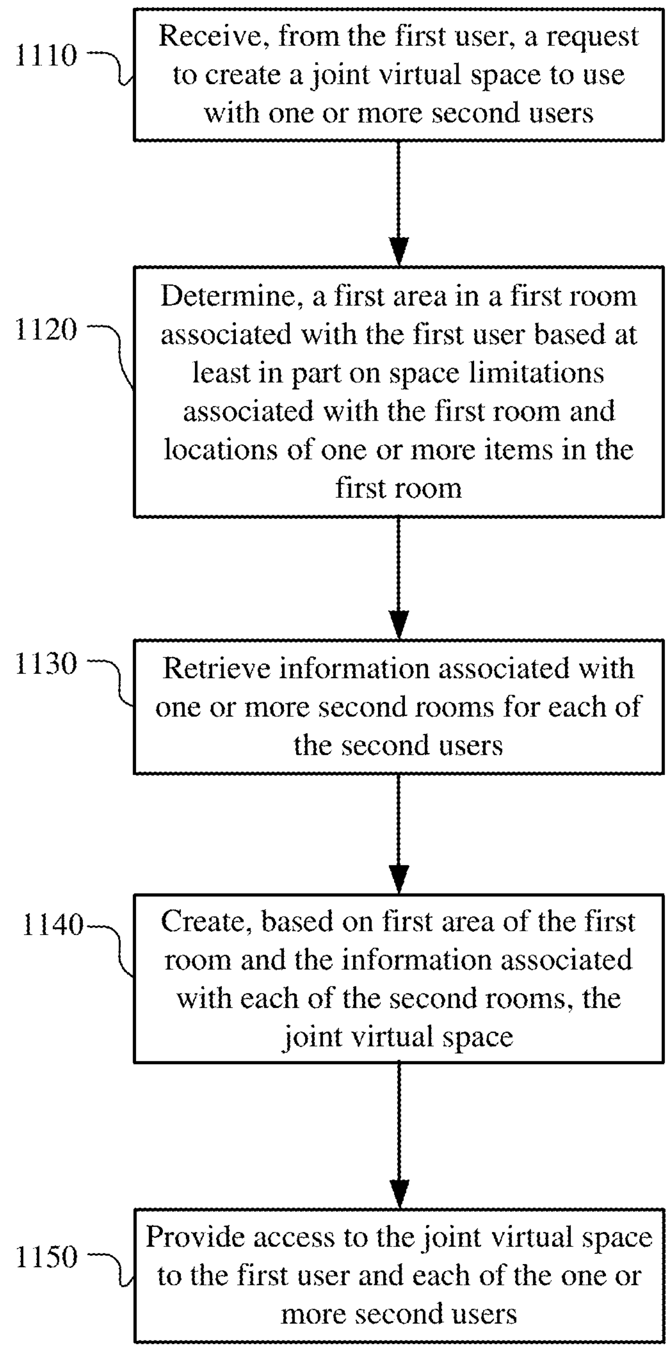
FIG. 11 illustrates an example method for designating a space for merging an artificial reality system with other users.

FIG. 11 illustrates an example method for designating a space for merging an artificial reality system with other users. The method may begin at step 1110, where the artificial reality system may receive, from the first user, a request to create a joint virtual space to use with one or more second users. At step 1120, the artificial reality system may determine, a first area in a first room associated with the first user based at least in part on space limitations associated with the first room and locations of one or more items in the first room. At step 1130, the artificial reality system may retrieve information associated with one or more second rooms for each of the second users. At step 1140, the artificial reality system may create, based on first area of the first room and the information associated with each of the second rooms, the joint virtual space. At step 1150, the artificial reality system may provide access to the joint virtual space to the first user and each of the one or more second users.

In particular embodiments, the artificial reality system may, prior to retrieving information associated with the one or more second rooms, determine whether the first area in the first room is equal to or larger than a predetermined minimum area. In particular embodiments, the first area may be determined by calculating the maximum free space associated with the first room after assessing the space limitations and the locations of the one or more items in the first room. The retrieved information associated with the second rooms may comprise at least space limitations associated with each of the second rooms for each of the second users, and locations of one or more items in each of the second rooms for each of the second users. The artificial reality system may determine a second area for each of the one or more second rooms based at least in part on the space limitations and the locations of the one or more items, wherein the second area is determined by calculating the maximum free space associated with each of the one or more second rooms after assessing the space limitations and the locations of the one or more items in each of the one or more second rooms. The joint virtual space may created by determining a maximum overlap between the maximum free space associated with the first room and the maximum free space associated with each of the one or more second rooms.

In particular embodiments, the providing access to the joint virtual space comprises notifying the first user and each of the one or more second users that the joint virtual space is available for use. The notifying the first user and each of the one or more second users may comprise sending instructions to the first user and each of the one or more second users to generate a portal object that allows that first user and each of the one or more second users to virtually access the joint virtual space. In particular embodiments, generating a portal object may comprise sending instructions to the first user to draw a virtual doorway within the first area in the first room that allows that first user to virtually access the joint virtual space, and sending instructions to each of the second users to draw a virtual doorway in the each of the second rooms that allows that each of the second users to virtually access the joint virtual space. In particular embodiments, the joint virtual space may reside in a virtual reality environment, and the first user and each of the one or more second users may be virtual users in the virtual reality environment.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for designating a space for merging an artificial reality system with other users including the particular steps of the method of FIG. 11, this disclosure contemplates any suitable method for designating a space for merging an artificial reality system with other users including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Shared Spaces

In particular embodiments, one or more users may want to collaborate with each other using content that all users can view and dynamically interact with. Particular embodiments described herein are directed to an artificial reality system that synchronizes content and objects from real life with those in the digital/VR environment to enhance user interaction, communication, and cooperation with other users (e.g., for collaborating on projects). This system may first determine what objects within the user's real-life environment the user may want to use to collaborate with other users. Then, the system may copy and present the real-life objects within the UI of the VR shared space in real time so that other users in the VR shared space can view and interact with the objects.

Figure 12:
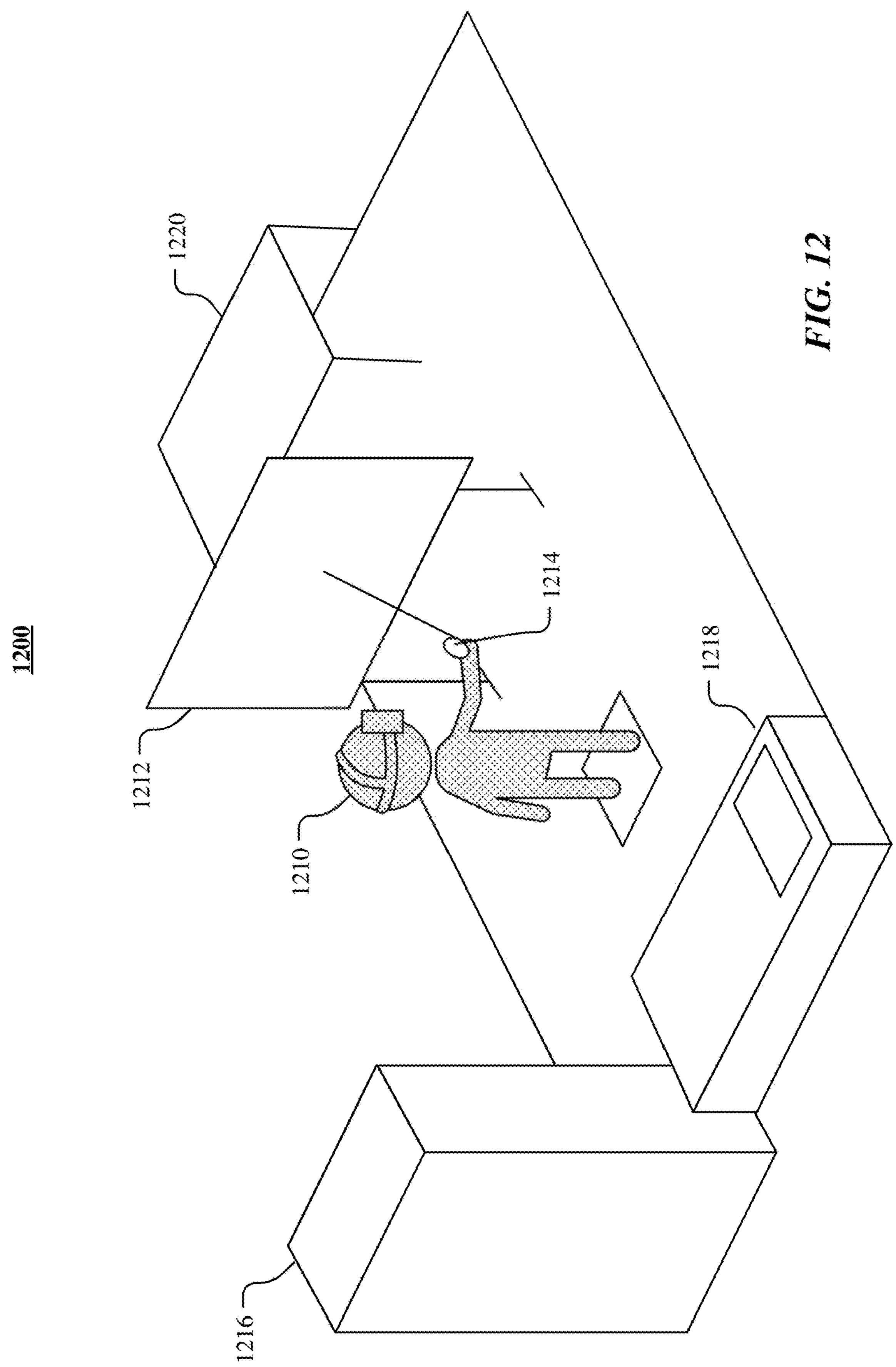
FIG. 12 illustrates a first user designating an object for sharing with other users in an artificial reality system.

In particular embodiments, the artificial reality system may first determine whether the user is interacting with an object that can be used to communicate and collaborate with other users. As an example, the system may detect that the object that the user is interacting with can be viewed and shared with other users or has been designated as an object that can be viewed and shared with other users. Alternatively, the user may request the system to share an object with other users by presenting an image, a video, a real-time view, or any other suitable presentation of the object to the other users. FIG. 12 illustrates a first user designating an object for sharing with other users in an artificial reality system. As shown in FIG. 12, user 1210 is interacting with a stand-alone screen 1212 using a device 1214. As an example, the screen 1212 may be a screen that is not connected to the virtual reality system (e.g., a chalkboard, a whiteboard, etc.). As another example, the screen 1212 or may be a screen that is connected to the virtual reality system in which any information written on the screen will be copied, saved, and accessible via the system. In addition, as an example, the device 1214 may be a physical device that allows the user 1210 to interact with the screen 1212 in the real world (e.g., a writing device, a pointer device, etc.). As another example, the device 1214 may be an electronic device that allows the user 1210 to interact with the screen 1212 in the real world (e.g., an electronic pointer device) or in the virtual world (e.g., controller 106).

In particular embodiments, as shown in FIG. 12, in the area surrounding the user 1210, there is also a bookshelf 1216, bed 1218, and a desk 1220. Among these objects in the room, the artificial reality system may determine that the bookshelf 1216 and the bed 1218 are not objects that would be designated as objects for sharing information with other users in the artificial reality system, while the desk 1220 may be designated as an object for sharing information for other users in the artificial reality system. In addition, the user 1210 may designate the screen 1212 as the object for sharing information with other users. In particular embodiments, the artificial reality system may access the environment surrounding the user 1210 to determine the positions, locations, and/or orientations of the bookshelf 1216, bed 1218, and desk 1220, and include these objects in the virtual reality display along with the screen 1212. This may provide the users with a more realistic scene and context for the location of the screen 1212, so that the users are not just viewing a screen floating in 3D space.

Figure 13:
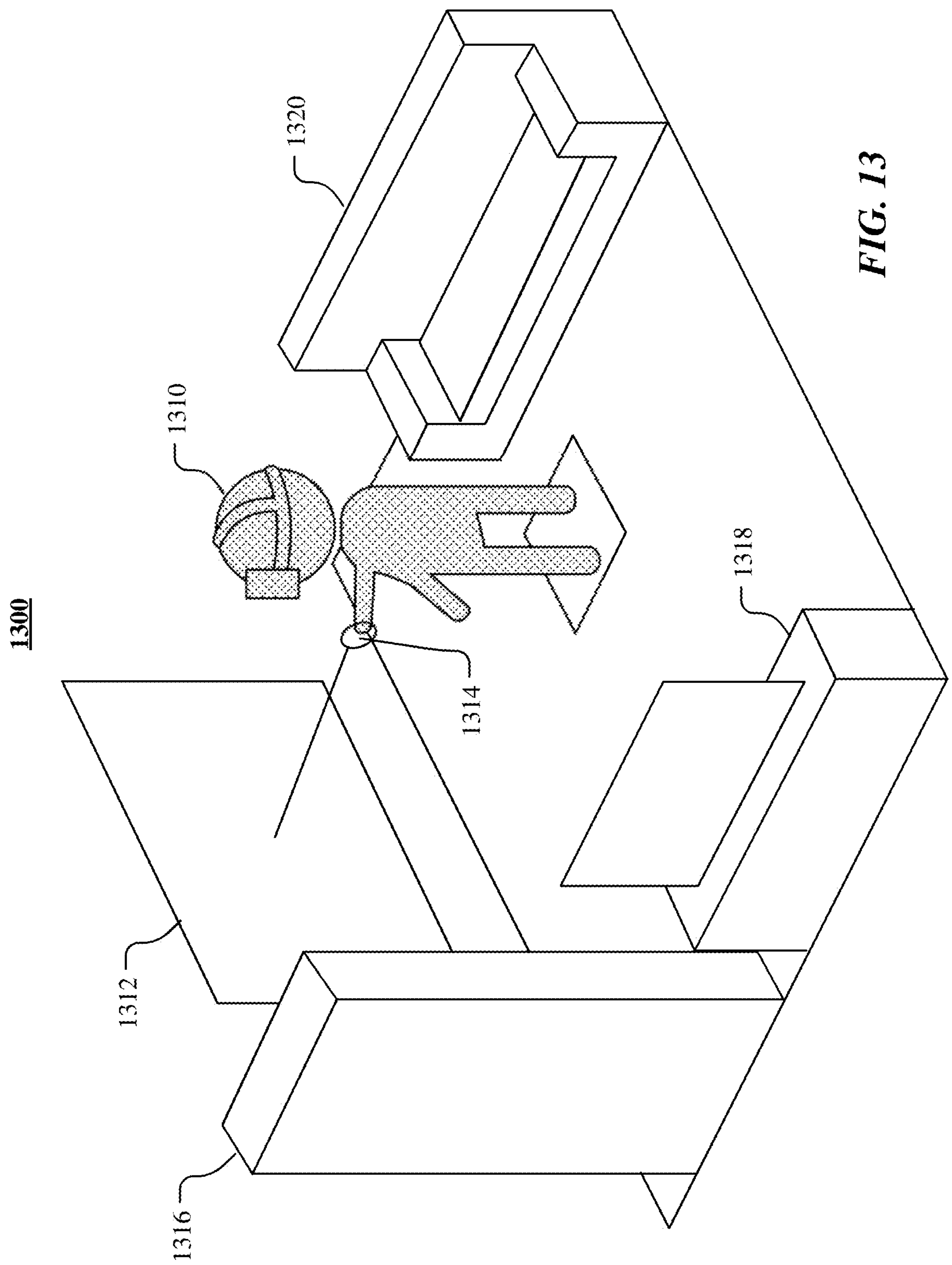
FIG. 13 illustrates a second user designating an object for sharing with other users in an artificial reality system.

FIG. 13 illustrates a second user designating an object for sharing with other users in an artificial reality system. As shown in FIG. 13, user 1310 is interacting with a screen 1312 located on a wall of the room. As an example, the screen 1312 may be a physical screen located on the wall. Alternatively, the screen 1312 may be a projected screen positioned on the wall and projected from a component of the artificial reality system or other projection system. In addition, similar to the example above, the screen 1312 may be a screen that is not connected to the virtual reality system (e.g., in the case of a physical screen), or may be a screen that is connected to the virtual reality system in which any information written on the screen will be copied, saved, and accessible via the system (e.g., in the case of the projected screen). The user 1310 may interact with the screen 1312 using a device 1314, which may be a physical device that allows the user 1310 to interact with the screen 1312 in the real world, or an electronic device that allows the user 1310 to interact with the screen 1312 in the real world (e.g., an electronic pointer device) or in the virtual world (e.g., controller 106).

In particular embodiments, as shown in FIG. 13, in the area surrounding the user 1210, there is also a bookshelf 1316, a television stand 1318, and a sofa 1320. Among these objects in the room, the artificial reality system may determine that the bookshelf 1316 and the sofa 1320 are not objects that would be designated as objects for sharing information with other users in the artificial reality system, while the television stand 1318 (with the associated television) may be designated as an object for sharing information for other users in the artificial reality system. In addition, the user 1310 may designate the screen 1312 as the object for sharing information with other users and/or for receiving shared information from other users. In particular embodiments, the artificial reality system may access the environment surrounding the user 1310 to determine the positions, locations, and/or orientations of the bookshelf 1316, a television stand 1318, and sofa 1320, and include these objects in the virtual reality display along with the screen 1312. As discussed above, this may provide the users with a more realistic scene and context for the location of the screen 1312, so that the users are not just viewing a screen floating in 3D space In particular embodiments, once the artificial reality system determines the user is interacting with an object that can be used to communicate and collaborate with other users, the artificial reality system may send a query to the user to determine whether the user wants to share a display of an interactive object with one or more other users. Alternatively, the artificial reality system may receive a request from the user requesting to share the display of the interactive object with one or more other users. In both situations, the artificial reality system may ask the user which other users the user wants to invite to participate in the sharing of the display of an interactive object. As an example, the artificial reality system may send a list of other users to the user to select from. As another example, the artificial reality system may maintain a list of other users that have expressed interest in participating in the sharing of the display of an interactive object. The other users may be users from the user's social network as determined through social-graph information (e.g., nodes and edges, affinities, and degrees of separation), as discussed in more detail below. In particular embodiments, the other users may be determined by any suitable means, including but not limited to one or more temporal limits (e.g., other users using the artificial reality system during the same time period as user), one or more location-based limits (e.g., other users within a geographic distance or within a particular geographic area), one or more degrees of separation, one or more affiliation coefficients between the user and the others users, one or more commonalities between the user and the others users, or any combination thereof.

Figure 14A:
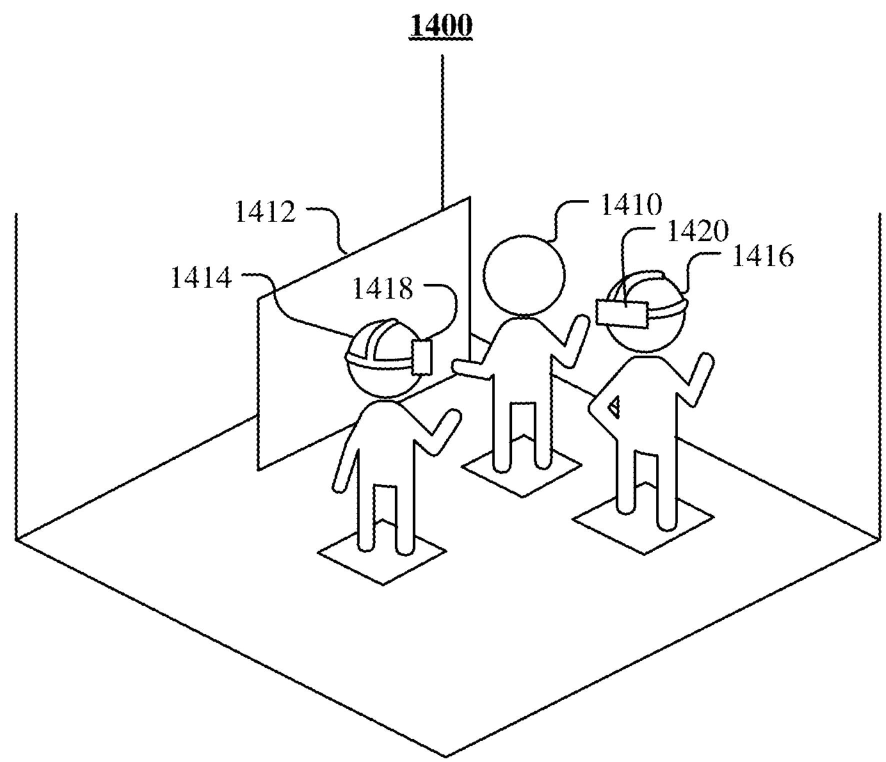
FIGS. 14A and 14B illustrate various environments for various users to view a shared object.
Figure 14B:
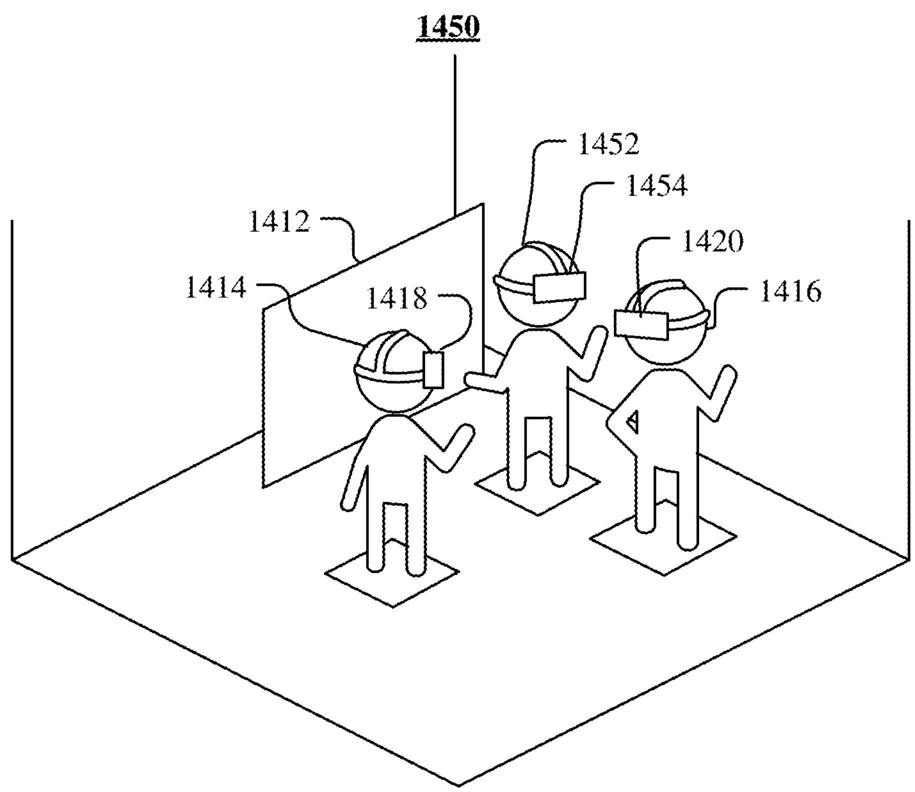

FIGS. 14A and 14B illustrate various environments 1400, 1450 for various users to view a shared object. In particular embodiments, a user can write on a real-life whiteboard, and the artificial reality system can synchronize the writing on the whiteboard with a virtual whiteboard so that other users in virtual reality (e.g., in a VR shared space similar to one described above) can view and interact with the user and the content on the whiteboard. As shown in FIG. 14, user 1410 may be a user that is interacting with a real-life whiteboard and using the whiteboard to write and display content to collaborate with other users 1414 and 1416. The other users 1414 and 1416 may be virtual users that are using headsets 1418 and 1420, respectively, to view the content display on a virtual whiteboard 1412 that is a copy of the real-life whiteboard. Users 1414 and 1416 may access the displayed whiteboard 1412 via a VR shared space (as discussed above). In particular embodiments, in order to display the whiteboard in virtual reality, the artificial reality system may generate a virtual whiteboard 1412 (e.g., a virtual item) as a copy of the real-life whiteboard, and then display the virtual whiteboard 1412 in the virtual reality environment (e.g., the VR shared space) to users 1414 and 1416. In addition, the artificial reality system may also create of copy of the user 1410, or use an avatar associated with the user 1410, to be displayed in the virtual reality environment with the virtual whiteboard 1412. In particular embodiments, if changes are made to the real-life whiteboard (e.g., the user 1410 write more content on the whiteboard), then the artificial reality system will update the virtual whiteboard 1412 to include the same changes as the real-life whiteboard. This allows for the synchronizing of content and objects from real life with representative versions of them in the virtual reality environment to create a mixed-reality environment that enhances interaction, communication, and collaboration between users. As an example, users 1414 and 1416 may provide comments associated with the content on the virtual whiteboard 1412, which may be sent to the user 1410 individually or be visible to all users viewing the virtual whiteboard 1412.

In particular embodiments, when the user writes on the real-life whiteboard, and the artificial reality system synchronizes the writing on the whiteboard with a virtual whiteboard so that other users in virtual reality (e.g., in a VR shared space similar to one described above) can view and interact with the user and the content on the whiteboard, only the copy of the real-life whiteboard is displayed in virtual reality (and not the user 1410). Instead, users 1414 and 1416, and an additional new user 1452 can view only the virtual whiteboard 1412 through headsets 1418, 1420, and 1454, respectively, and are only interacting with the content on the virtual whiteboard 1412. Similar to the embodiment discussed above, if changes are made to the real-life whiteboard (e.g., the user 1410 write more content on the whiteboard), then the artificial reality system will update the virtual whiteboard 1412 to include the same changes as the real-life whiteboard. This allows for the synchronizing of content and objects from real life with representative versions of them in the virtual reality environment to create a mixed-reality environment that enhances interaction, communication, and collaboration between users. As an example, users 1414, 1416, and 1454 may provide comments associated with the content on the virtual whiteboard 1412, which may be sent to the user 1410 individually or be visible to all users viewing the virtual whiteboard 1412.

In particular embodiments, as another example, the user may have a question regarding certain content on their computer screen, and can request the system to synchronize the computer screen with a virtual computer screen in order to invite another user in the VR shared space to help resolve an issue or answer a question regarding the content on the computer screen. Similar to the situation discussed above, the artificial reality system may receive a request from a first user to share a display of the computer screen with one or more second users. As an example, this may be due to a computer problem that the first user is experiencing on the computer, and the fastest way to resolve the problem may be to ask another user to visually assess the computer (instead of explaining the problem over the telephone). As another example, this may be due to the first user wanting to share content on the computer screen with another user (e.g., to collaborate on a project). As such, the artificial reality system may generate a copy of the computer screen to display in a virtual environment, and then allow the second user to view the virtual computer screen in the virtual environment. If changes are made to the content displayed on the computer screen by the first user, the virtual computer screen is updated to display those changes. Similar to the embodiments discussed above, this allows for the synchronizing of content and objects from real life with representative versions of them in the virtual reality environment to create a mixed-reality environment that enhances interaction, communication, and collaboration between users.

Figure 15:
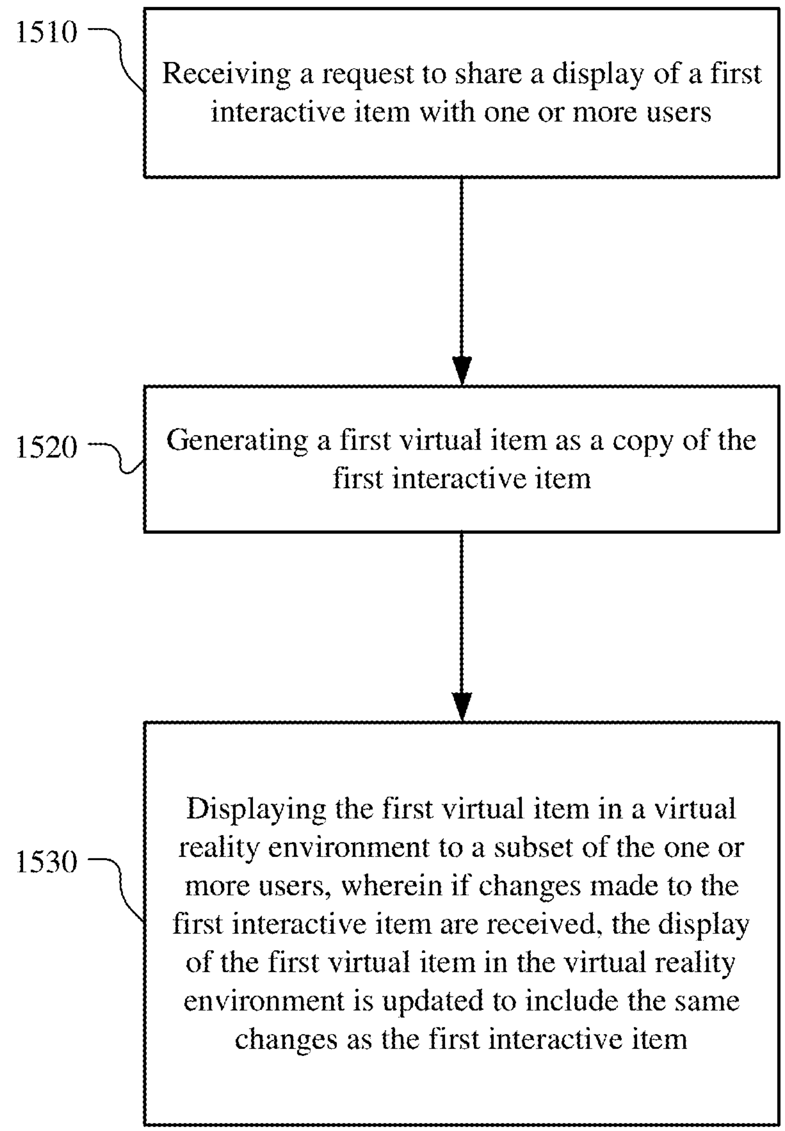
FIG. 15 illustrates an example method for designating and sharing various objects with other users in an artificial reality system.

FIG. 15 illustrates an example method for designating and sharing various objects with other users in an artificial reality system. The method may begin at step 1510, where the artificial reality system may receive a request to share a display of a first interactive item with one or more users. At step 1520, the artificial reality system may generate a first virtual item as a copy of the first interactive item. At step 1530, the artificial reality system may display the first virtual item in a virtual reality environment to a subset of the one or more users, wherein if changes made to the first interactive item are received, the display of the first virtual item in the virtual reality environment is updated to include the same changes as the first interactive item. In particular embodiments, the request to share the display of the first interactive item may be from a first user of the one or more users that is currently interacting with the first interactive item. In particular embodiments, the request to share the display of the first interactive item may be from one or more second users, the one or more second users being virtual users associated with the virtual reality environment. In particular embodiments, prior to receiving the request to share the display of the first interactive item, the artificial reality system may determine one or more interactive items in an environment and send the list of interactive items to a first user for selection of at least one of the interactive items to display in the virtual reality environment. In particular embodiments, the subset of the one or more users may comprise virtual users in the virtual reality environment.

In particular embodiments, the first interactive item may be located in a real-world environment. The artificial reality system may access a location of the first interactive item in relation to one or more other items surrounding the first interactive item in the real-world environment, generate one or more second virtual items as copies of the one or more other items, and display the first virtual item and the one or more second virtual items in the virtual reality environment based on the location of the first interactive item in relation to the one or more other items in the real-world environment. In addition, the artificial reality system may access an orientation of the first interactive item in the real-world environment, and display the first virtual item in the virtual reality environment based on the orientation of the first interactive item in the real-world environment. In particular embodiments, the artificial reality system may receive, from one or more users of the subset of users, comments associated with the first virtual item and send the comments to be displayed to a first user of the one or more users that is currently interacting with the first interactive item in a real-world environment. The comments may comprise one or more of audio comments, video comments, or written comments.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for designating and sharing various objects with other users in an artificial reality system including the particular steps of the method of FIG. 15, this disclosure contemplates any suitable method for designating and sharing various objects with other users in an artificial reality system including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

System Overview

Figure 16:
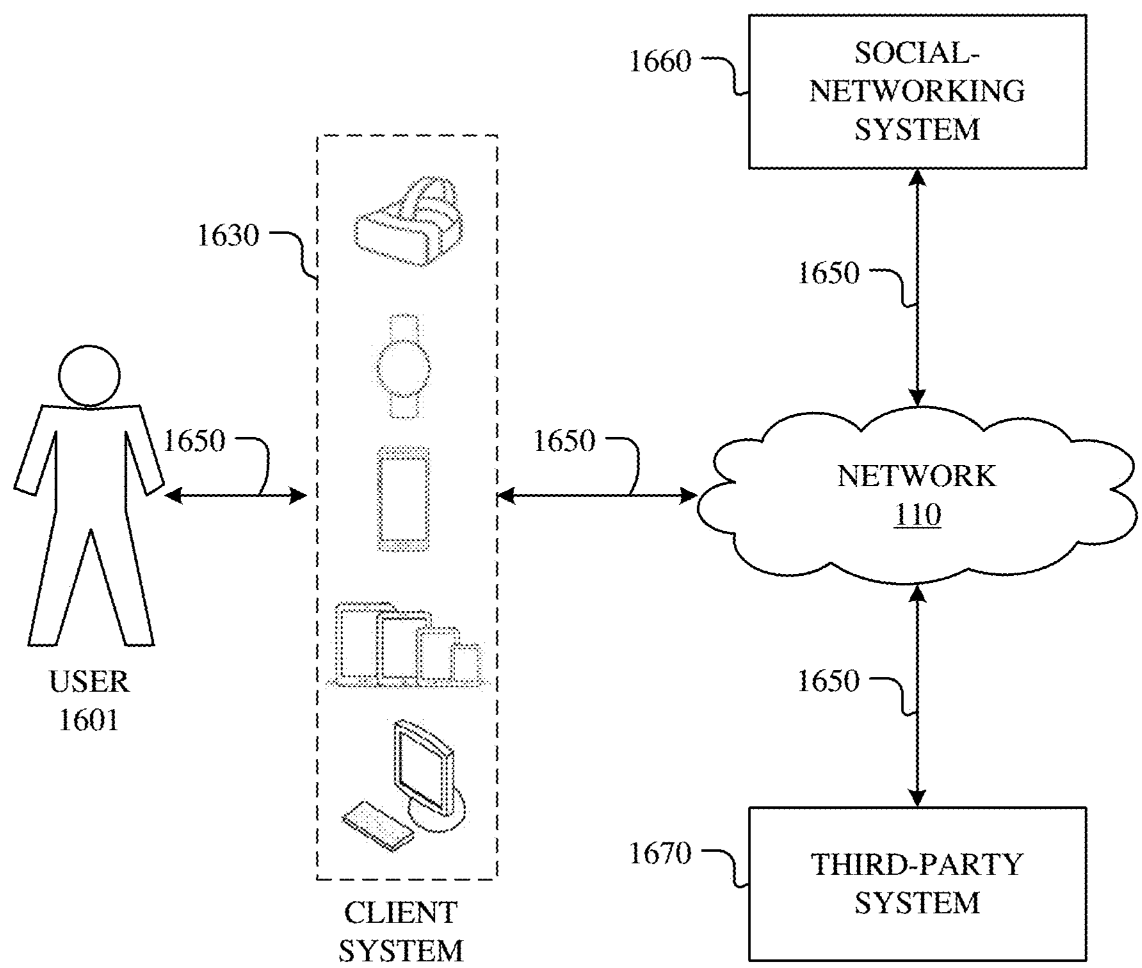
FIG. 16 illustrates an example network environment associated with a social-networking system.

FIG. 16 illustrates an example network environment 1600 associated with a social-networking system. Network environment 1600 includes a user 1601, a client system 1630, a social-networking system 1660, and a third-party system

1670 connected to each other by a network 1610. Although FIG. 1 illustrates a particular arrangement of user 1601, client system 1630, social-networking system 1660, third-party system 1670, and network 1610, this disclosure contemplates any suitable arrangement of user 1601, client system 1630, social-networking system 160, third-party system 1670, and network 1610. As an example and not by way of limitation, two or more of client system 1630, social-networking system 1660, and third-party system 1670 may be connected to each other directly, bypassing network 1610. As another example, two or more of client system 1630, social-networking system 1660, and third-party system 1670 may be physically or logically co-located with each other in whole or in part. Moreover, although FIG. 16 illustrates a particular number of users 1601, client systems 1630, social-networking systems 1660, third-party systems 1670, and networks 1610, this disclosure contemplates any suitable number of users 1601, client systems 1630, social-networking systems 1660, third-party systems 1670, and networks 1610. As an example and not by way of limitation, network environment 1600 may include multiple users 1601, client system 1630, social-networking systems 1660, third-party systems 1670, and networks 1610.

In particular embodiments, user 1601 may be an individual (human user), an entity (e.g., an enterprise, business, or third-party application), or a group (e.g., of individuals or entities) that interacts or communicates with or over social-networking system 1660. In particular embodiments, social-networking system 1660 may be a network-addressable computing system hosting an online social network. Social-networking system 1660 may generate, store, receive, and send social-networking data, such as, for example, user-profile data, concept-profile data, social-graph information, or other suitable data related to the online social network. Social-networking system 1660 may be accessed by the other components of network environment 1600 either directly or via network 1610. In particular embodiments, social-networking system 160 may include an authorization server (or other suitable component(s)) that allows users 1601 to opt in to or opt out of having their actions logged by social-networking system 1660 or shared with other systems (e.g., third-party systems 1670), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 1670 may be a network-addressable computing system. Third-party system 1670 may be accessed by the other components of network environment 1600 either directly or via network 1610. In particular embodiments, one or more users 1601 may use one or more client systems 1630 to access, send data to, and receive data from social-networking system 1660 or third-party system 1670. Client system 1630 may access social-networking system 1660 or third-party system 1670 directly, via network 1610, or via a third-party system. As an example and not by way of limitation, client system 1630 may access third-party system 1670 via social-networking system 1660. Client system 1630 may be any suitable computing device, such as, for example, a personal computer, a laptop computer, a cellular telephone, a smartphone, a tablet computer, or an augmented/virtual reality device.

This disclosure contemplates any suitable network 1610. As an example and not by way of limitation, one or more portions of network 1610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1610 may include one or more networks 1610.

Links 1650 may connect client system 1630, social-networking system 1660, and third-party system 1670 to communication network 1610 or to each other. This disclosure contemplates any suitable links 1650. In particular embodiments, one or more links 1650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1650, or a combination of two or more such links 1650. Links 1650 need not necessarily be the same throughout network environment 1600. One or more first links 1650 may differ in one or more respects from one or more second links 1650.

Social Graphs

Figure 17:
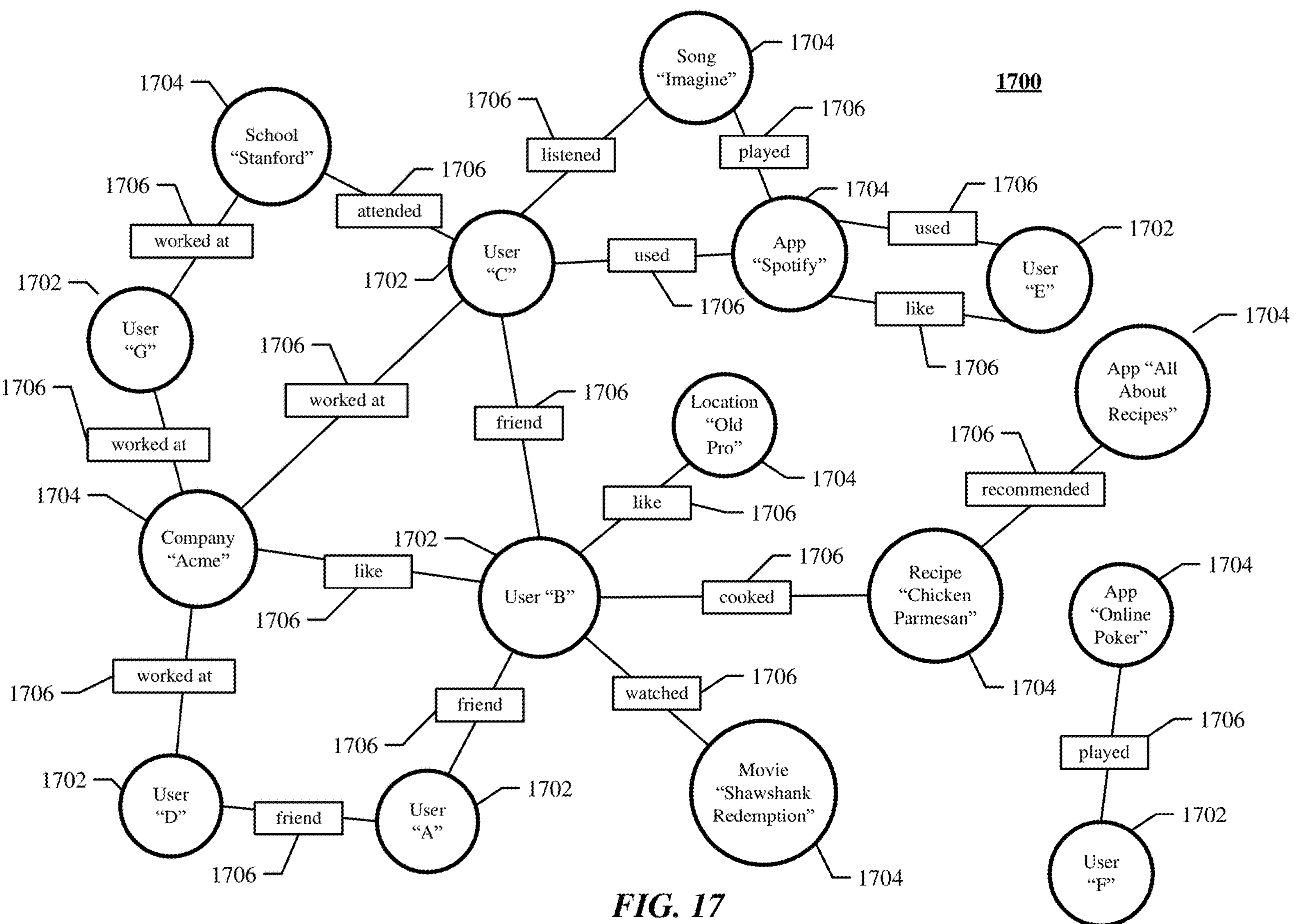
FIG. 17 illustrates an example social graph.

FIG. 17 illustrates example social graph 1700. In particular embodiments, social-networking system 160 may store one or more social graphs 1700 in one or more data stores. In particular embodiments, social graph 1700 may include multiple nodes—which may include multiple user nodes 1702 or multiple concept nodes 1704—and multiple edges 1706 connecting the nodes. Example social graph 1700 illustrated in FIG. 17 is shown, for didactic purposes, in a two-dimensional visual map representation. In particular embodiments, a social-networking system 1660, client system 1630, or third-party system 1670 may access social graph 1700 and related social-graph information for suitable applications. The nodes and edges of social graph 1700 may be stored as data objects, for example, in a data store (such as a social-graph database). Such a data store may include one or more searchable or queryable indexes of nodes or edges of social graph 1700.

In particular embodiments, a user node 1702 may correspond to a user of social-networking system 1660. As an example and not by way of limitation, a user may be an individual (human user), an entity (e.g., an enterprise, business, or third-party application), or a group (e.g., of individuals or entities) that interacts or communicates with or over social-networking system 1660. In particular embodiments, when a user registers for an account with social-networking system 1660, social-networking system 1660 may create a user node 1702 corresponding to the user, and store the user node 1702 in one or more data stores. Users and user nodes 1702 described herein may, where appropriate, refer to registered users and user nodes 1702 associated with registered users. In addition or as an alternative, users and user nodes 1702 described herein may, where appropriate, refer to users that have not registered with social-networking system 1660. In particular embodiments, a user node 1702 may be associated with information provided by a user or information gathered by various systems, including social-networking system 1660. As an example and not by way of limitation, a user may provide his or her name, profile picture, contact information, birth date, sex, marital status, family status, employment, education background, preferences, interests, or other demographic information. In particular embodiments, a user node 1702 may be associated with one or more data objects corresponding to information associated with a user. In particular embodiments, a user node 1702 may correspond to one or more webpages.

In particular embodiments, a concept node 1704 may correspond to a concept. As an example and not by way of limitation, a concept may correspond to a place (such as, for example, a movie theater, restaurant, landmark, or city); a website (such as, for example, a website associated with social-network system 1660 or a third-party website associated with a web-application server); an entity (such as, for example, a person, business, group, sports team, or celebrity); a resource (such as, for example, an audio file, video file, digital photo, text file, structured document, or application) which may be located within social-networking system 1660 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1704 may be associated with information of a concept provided by a user or information gathered by various systems, including social-networking system 1660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1704 may be associated with one or more data objects corresponding to information associated with concept node 1704. In particular embodiments, a concept node 1704 may correspond to one or more webpages.

In particular embodiments, a node in social graph 1700 may represent or be represented by a webpage (which may be referred to as a "profile page"). Profile pages may be hosted by or accessible to social-networking system 1606. Profile pages may also be hosted on third-party websites associated with a third-party server 1670. As an example and not by way of limitation, a profile page corresponding to a particular external webpage may be the particular external webpage and the profile page may correspond to a particular concept node 1704. Profile pages may be viewable by all or a selected subset of other users. As an example and not by way of limitation, a user node 1702 may have a corresponding user-profile page in which the corresponding user may add content, make declarations, or otherwise express himself or herself. As another example and not by way of limitation, a concept node 1704 may have a corresponding concept-profile page in which one or more users may add content, make declarations, or express themselves, particularly in relation to the concept corresponding to concept node 1704.

In particular embodiments, a concept node 1704 may represent a third-party webpage or resource hosted by a third-party system 1670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 1660 a message indicating the user's action. In response to the message, social-networking system 1660 may create an edge (e.g., a check-in-type edge) between a user node 1702 corresponding to the user and a concept node 1704 corresponding to the third-party webpage or resource and store edge 1706 in one or more data stores.

In particular embodiments, a pair of nodes in social graph 1700 may be connected to each other by one or more edges 1706. An edge 1706 connecting a pair of nodes may represent a relationship between the pair of nodes. In particular embodiments, an edge 1706 may include or represent one or more data objects or attributes corresponding to the relationship between a pair of nodes. As an example and not by way of limitation, a first user may indicate that a second user is a "friend" of the first user. In response to this indication, social-networking system 1660 may send a "friend request" to the second user. If the second user confirms the "friend request," social-networking system 1660 may create an edge 1706 connecting the first user's user node 1702 to the second user's user node 1702 in social graph 1700 and store edge 1706 as social-graph information in one or more of data stores 1664. In the example of FIG. 17, social graph 1700 includes an edge 1706 indicating a friend relation between user nodes 1702 of user "A" and user "B" and an edge indicating a friend relation between user nodes 1702 of user "C" and user "B." Although this disclosure describes or illustrates particular edges 1706 with particular attributes connecting particular user nodes 1702, this disclosure contemplates any suitable edges 1706 with any suitable attributes connecting user nodes 1702. As an example and not by way of limitation, an edge 1706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1700 by one or more edges 1706.

In particular embodiments, an edge 1706 between a user node 1702 and a concept node 1704 may represent a particular action or activity performed by a user associated with user node 1702 toward a concept associated with a concept node 1704. As an example and not by way of limitation, as illustrated in FIG. 17, a user may "like," "attended," "played," "listened," "cooked," "worked at," or "watched" a concept, each of which may correspond to a edge type or subtype. A concept-profile page corresponding to a concept node 1704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1660 may create a "listened" edge 1706 and a "used" edge (as illustrated in FIG. 17) between user nodes 1702 corresponding to the user and concept nodes 1704 corresponding to the song and application to indicate that the user listened to the song and used the application. Moreover, social-networking system 1660 may create a "played" edge 1706 (as illustrated in FIG. 17) between concept nodes 1704 corresponding to the song and the application to indicate that the particular song was played by the particular application. In this case, "played" edge 1706 corresponds to an action performed by an external application (SPOTIFY) on an external audio file (the song "Imagine"). Although this disclosure describes particular edges 1706 with particular attributes connecting user nodes 1702 and concept nodes 1704, this disclosure contemplates any suitable edges 1706 with any suitable attributes connecting user nodes 1702 and concept nodes 1704. Moreover, although this disclosure describes edges between a user node 1702 and a concept node 1704 representing a single relationship, this disclosure contemplates edges between a user node 1702 and a concept node 1704 representing one or more relationships. As an example and not by way of limitation, an edge 1706 may represent both that a user likes and has used at a particular concept. Alternatively, another edge 1706 may represent each type of relationship (or multiples of a single relationship) between a user node 1702 and a concept node 1704 (as illustrated in FIG. 17 between user node 1702 for user "E" and concept node 1704 for "SPOTIFY").

In particular embodiments, social-networking system 1660 may create an edge 1706 between a user node 1702 and a concept node 1704 in social graph 1700. As an example and not by way of limitation, a user viewing a concept-profile page (such as, for example, by using a web browser or a special-purpose application hosted by the user's client system 1630) may indicate that he or she likes the concept represented by the concept node 1704 by clicking or selecting a "Like" icon, which may cause the user's client system 1630 to send to social-networking system 1660 a message indicating the user's liking of the concept associated with the concept-profile page. In response to the message, social-networking system 1660 may create an edge 1706 between user node 1702 associated with the user and concept node 1704, as illustrated by "like" edge 1706 between the user and concept node 1704. In particular embodiments, social-networking system 1660 may store an edge 1706 in one or more data stores. In particular embodiments, an edge 1706 may be automatically formed by social-networking system 1660 in response to a particular user action. As an example and not by way of limitation, if a first user uploads a picture, watches a movie, or listens to a song, an edge 1706 may be formed between user node 1702 corresponding to the first user and concept nodes 1704 corresponding to those concepts. Although this disclosure describes forming particular edges 1706 in particular manners, this disclosure contemplates forming any suitable edges 1706 in any suitable manner.

Social Graph Affinity and Coefficient

In particular embodiments, social-networking system 1660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1660 may calculate a coefficient based on a user's actions. Social-networking system 1660 may monitor such actions on the online social network, on a third-party system 1670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1660 may calculate a coefficient based on the user's actions with particular types of content. The content may be associated with the online social network, a third-party system 1670, or another suitable system. The content may include users, profile pages, posts, news stories, headlines, instant messages, chat room conversations, emails, advertisements, pictures, video, music, other suitable objects, or any combination thereof. Social-networking system 1660 may analyze a user's actions to determine whether one or more of the actions indicate an affinity for subject matter, content, other users, and so forth. As an example and not by way of limitation, if a user may make frequently posts content related to "coffee" or variants thereof, social-networking system 1660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1660 may calculate a coefficient based on the type of relationship between particular objects. Referencing the social graph 1700, social-networking system 1660 may analyze the number and/or type of edges 1706 connecting particular user nodes 1702 and concept nodes 1704 when calculating a coefficient. As an example and not by way of limitation, user nodes 1702 that are connected by a spouse-type edge (representing that the two users are married) may be assigned a higher coefficient than a user nodes 1702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1660 may determine that the user has a higher coefficient with respect to the first photo than the second photo because having a tagged-in-type relationship with content may be assigned a higher weight and/or rating than having a like-type relationship with content. In particular embodiments, social-networking system 1660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1700. As an example and not by way of limitation, social-graph entities that are closer in the social graph 1700 (i.e., fewer degrees of separation) may have a higher coefficient than entities that are further apart in the social graph 1700.

In particular embodiments, social-networking system 1660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1630 of the user). A first user may be more interested in other users or concepts that are closer to the first user. As an example and not by way of limitation, if a user is one mile from an airport and two miles from a gas station, social-networking system 1660 may determine that the user has a higher coefficient for the airport than the gas station based on the proximity of the airport to the user.

In particular embodiments, social-networking system 1660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1660 may provide information that is relevant to user's interests and current circumstances, increasing the likelihood that they will find such information of interest. In particular embodiments, social-networking system 1660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1670 (e.g., via an API or other communication channel), or from another suitable system. In response to the request, social-networking system 1660 may calculate the coefficient (or access the coefficient information if it has previously been calculated and stored). In particular embodiments, social-networking system 1660 may measure an affinity with respect to a particular process. Different processes (both internal and external to the online social network) may request a coefficient for a particular object or set of objects. Social-networking system 1660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006 (issued as U.S. Pat. No. 8,402,094 on 19 Mar. 2013), U.S. patent application Ser. No. 12/977,027, filed 22 Dec. 2010 (issued as U.S. Pat. No. 10,304,066 on 28 May 2019), U.S. patent application Ser. No. 12/978,265, filed 23 Dec. 2010, and U.S. patent application Ser. No. 13/632,869, filed 1 Oct. 2012 (issued as U.S. Pat. No. 9,654,591 on 16 May 2017), each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1704 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 1670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1662 may be authorization/privacy servers for enforcing privacy settings. In response to a request from a user (or other entity) for a particular object stored in a data store 1664, social-networking system 160 may send a request to the data store 1664 for the object. The request may identify the user associated with the request and may only be sent to the user (or a client system 1630 of the user) if the authorization server determines that the user is authorized to access the object based on the privacy settings associated with the object. If the requesting user is not authorized to access the object, the authorization server may prevent the requested object from being retrieved from the data store 1664, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 18:
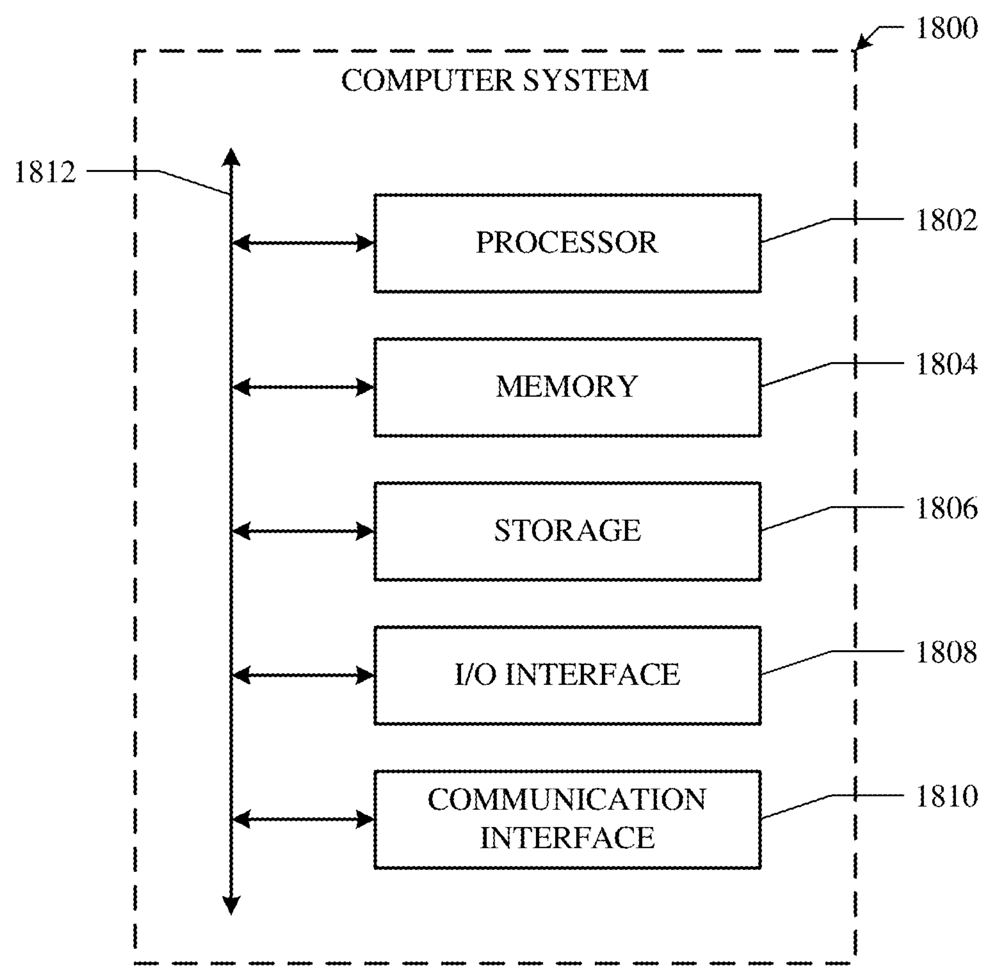
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing system:

displaying a first virtual content to a first user in a virtual environment;

inferring, based on at least a first user action, temporal information associated with the first user, and contextual information, an intent of the first user to interact with the first virtual content;

determining, in response to the inferred intent of the first user to interact with the first virtual content, (1) an object type associated with the first virtual content, or (2) a service type associated with the first virtual content;

determining, based on the object type or service type, instructions for modifying the virtual environment, the instructions being configured to enhance an experience of the first user with the first virtual content by reducing distractions caused by one or more light sources or audible sources in the virtual environment; and modifying the virtual environment according to the instructions, without the first user accessing a setting associated with the one or more light sources or audible sources, to reduce distractions from the first virtual content.

2. The method of claim 1, wherein the first user action comprises one or more of:

user eye movements focusing on the first virtual content, verbal requests by the first user, or user inputs associated with the first virtual content.

3. The method of claim 1, wherein the contextual information comprises one or more of:

location information associated with the first user, movement information associated with the first user, or preset actions associated with the first virtual content.

4. The method of claim 1, wherein the temporal information associated with the first user comprises a predetermined period of time of user inaction.

5. The method of claim 1, wherein the inferred intent of the first user is based at least in part on a perspective of a hypothetical user that is based at least in part on one or more users of a social network.

6. The method of claim 5, wherein the hypothetical user is based at least in part on:

each of the users of the social network, or one or more subsets of the users of the social network.

7. The method of claim 1, further comprising, based on the object type or service type, adjusting one or more social-networking properties associated with the first user to reduce distractions from the first virtual content.

8. The method of claim 7, wherein the adjusting of the social-networking properties comprises temporarily limiting or removing all notifications from a social network.

9. The method of claim 1, wherein the one or more light sources or audible sources are associated with an object type or a service type.

10. The method of claim 1, wherein the first user is a virtual user in the virtual environment.

11. One or more computer-readable non-transitory storage media embodying software that is operable when executed to:

display a first virtual content to a first user in a virtual environment;

infer, based on at least a first user action, temporal information associated with the first user, and contextual information, an intent of the first user to interact with the first virtual content;

determine, in response to the inferred intent of the first user to interact with the first virtual content, (1) an object type associated with the first virtual content, or (2) a service type associated with the first virtual content;

determine, based on the object type or service type, instructions for modifying the virtual environment, the instructions being configured to enhance an experience of the first user with the first virtual content by reducing distractions caused by one or more light sources or audible sources in the virtual environment; and modify the virtual environment according to the instructions, without the first user accessing a setting associated with the one or more light sources or audible sources, to reduce distractions from the first virtual content.

12. The media of claim 11, wherein the first user action comprises one or more of:

user eye movements focusing on the first virtual content, verbal requests by the first user, or user inputs associated with the first virtual content.

13. The media of claim 11, wherein the contextual information comprises one or more of:

location information associated with the first user, movement information associated with the first user, or preset actions associated with the first virtual content.

14. The media of claim 11, wherein the inferred intent of the first user is based at least in part on a perspective of a hypothetical user that is based at least in part on one or more users of a social network.

15. The media of claim 11, wherein the software is further operable when executed to, based on the object type or service type, adjust one or more social-networking properties associated with the first user to reduce distractions from the first virtual content.

16. A system comprising: one or more processors; and a memory coupled to the processors comprising instructions executable by the processors, the processors being operable when executing the instructions to:

display a first virtual content to a first user in a virtual environment;

infer, based on at least a first user action, temporal information associated with the first user, and contextual information, an intent of the first user to interact with the first virtual content;

determine, in response to the inferred intent of the first user to interact with the first virtual content, (1) an object type associated with the first virtual content, or (2) a service type associated with the first virtual content, determine, based on the object type or service type, instructions for modifying the virtual environment, the instructions being configured to enhance an experience of the first user with the first virtual content by reducing distractions caused by one or more light sources or audible sources in the virtual environment; and modify the virtual environment according to the instructions, without the first user accessing a setting associated with the one or more light sources or audible sources, to reduce distractions from the first virtual content.

17. The system of claim 16, wherein the first user action comprises one or more of:

user eye movements focusing on the first virtual content, verbal requests by the first user, or user inputs associated with the first virtual content.

18. The system of claim 16, wherein the contextual information comprises one or more of:

location information associated with the first user, movement information associated with the first user, or preset actions associated with the first virtual content.

19. The system of claim 16, wherein the inferred intent of the first user is based at least in part on a perspective of a hypothetical user that is based at least in part on one or more users of a social network.

20. The system of claim 16, wherein the one or more processors are further operable when executing the instructions to, based on the object type or service type, adjust one or more social-networking properties associated with the first user to reduce distractions from the first virtual content.

* * * * *